United States Patent
Senior et al.

(10) Patent No.: US 12,086,866 B2
(45) Date of Patent: Sep. 10, 2024

(54) SYSTEMS AND METHODS FOR PREVENTING MALICIOUS MODIFICATIONS TO ORDER INFORMATION SENT OVER A NETWORK

(71) Applicant: SHOPIFY INC., Ottawa (CA)

(72) Inventors: Robin James Senior, Toronto (CA); Kristopher Orr, Toronto (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 17/949,457

(22) Filed: Sep. 21, 2022

(65) Prior Publication Data

US 2024/0095810 A1 Mar. 21, 2024

(51) Int. Cl.
| | |
|---|---|
| *G06Q 30/0601* | (2023.01) |
| *G06Q 20/20* | (2012.01) |
| *G06Q 20/40* | (2012.01) |
| *G06Q 30/0226* | (2023.01) |

(52) U.S. Cl.
CPC ....... *G06Q 30/0637* (2013.01); *G06Q 20/208* (2013.01); *G06Q 20/4014* (2013.01); *G06Q 30/0226* (2013.01); *G06Q 30/0627* (2013.01)

(58) Field of Classification Search
CPC ..................................... G06Q 30/0207–0277
USPC .................................................. 705/14, 14.1
See application file for complete search history.

(56) References Cited

U.S. PATENT DOCUMENTS

| | | | | |
|---|---|---|---|---|
| 2009/0164354 | A1* | 6/2009 | Ledbetter | G06Q 20/40 705/30 |
| 2013/0275247 | A1* | 10/2013 | Ramaratnam | G06Q 20/20 705/16 |
| 2020/0184543 | A1* | 6/2020 | Hwu | G06Q 20/12 |
| 2021/0056608 | A1* | 2/2021 | Kulkarni | G06Q 30/0222 |

OTHER PUBLICATIONS

Wikipedia: "Mobile deep linking". Available online from https://en.wikipedia.org/wiki/Mobile_deep_linking. Published online at least as early as Jun. 2022 (exact earlier publication date not known). Last accessed online in Sep. 2022. 4 pages.

* cited by examiner

*Primary Examiner* — Afaf Osman Bilal Ahmed

(57) ABSTRACT

Payment solutions that allow a user to pay for an order in a store using a user device typically only pass the total payment amount to the user device. One way of displaying other order information on a user device involves the user device sending, to the server, a URL containing instructions for building an online page to display the order. However, this introduces the risk that a malicious user may modify the URL to remove an item from the order or change a price of an item without informing the merchant. The present application relates to systems and methods for preventing malicious activity by users when modifying order information. According to some aspects of the present disclosure, items entered into a merchant's point of sale device are sent to a server for storage in order information which can be retrieved by a user device using an identifier.

25 Claims, 12 Drawing Sheets

E-Commerce Platform | Q Search | JG John's Apparel / Jonny B. Good

- ⌂ Home
- ⇄ Orders
- ◇ Products
- ○+ Customers
- ⫶⫶ Reports
- ⚙ Discounts
- ⊞ Apps SALES CHANNELS ⊕
- 🏢 Online Store ◆
- ▭ Mobile App View all channels ⚙ Settings

Good afternoon, Jonny B..

Here's what's happening with your store today.

Today's total sales    Today's visits
$98.00                 1

● Update your Platform Payments tax details
We require additional information to verify your identity.
[Update tax details]

● Advanced Cash on Delivery has been deactivated for your store
[See why]

All channels ⌄         Today ⌄

TOTAL SALES
$98.00

$125
$75
$25
         12am    8pm   4pm   11pm
                             Jun 1
                             2 orders

TOTAL SALES BY CHANNEL    View dashboard

Online Store                  Jun 1
$0.00                         0 orders

Mobile app
$0.00                         0 orders

Shopify POS (126 York St.)
$0.00                         0 orders

FIG. 2

Order 1234567

|  | Quantity | Price |
|---|---|---|
| Item 1 | 1 | $10 |
| Item 2 | 1 | $35 |
| Item 3 | 1 | $7 |
| Discounts applied |  | $5 |
| Order total |  | $47 |

Payment for Order 1234567 has been completed
~ 1102

FIG. 11

SYSTEMS AND METHODS FOR PREVENTING MALICIOUS MODIFICATIONS TO ORDER INFORMATION SENT OVER A NETWORK

FIELD

The present application relates to managing modifications to order information sent over a network to a user device and, in particular, to managing modifications to the order information to enable the order information to be reviewed and modified whilst preventing malicious activity originating from the user device.

BACKGROUND

Payment solutions allow users to pay for purchases in stores using their user devices, such as smartphones or wearable devices. Typically, after a merchant scans products that the user wishes to purchase, the user presents their user device to a payment terminal for effecting payment for the products. After the order has been paid for, the mobile device may display the total payment amount to the user.

SUMMARY

In technologies that allow the user to pay using their user device (e.g. mobile device), the payment terminal typically only passes the total payment amount to the user's device. As a result, the user may be unable to view any other information relating to the order on their device and may not be able to make any changes to the order using their device.

One way of enabling a user to view their order before purchase involves the merchant presenting the user with a machine-readable code, such as a QR code, representing the scanned products. The user can scan the machine-readable code with their user device to generate a URL containing instructions for building an online page displaying the order. The URL may comprise mutable human-readable parameters. In some embodiments, the parameters may include one or more identifiers of items in the order and/or one or more identifiers of the user. Additionally or alternatively, the parameters may include one or more identifiers of the order. By following the URL, the user can view and pay for the order. Whilst this approach allows the user to view their order before payment, there is a risk that a malicious user may modify the URL to, for example, remove an item from the order without the merchant knowing.

According to some embodiments of the present invention, items entered into a merchant's point of sale device are sent to a server for storage in order information which can be retrieved by a user device using an identifier. The server notifies the merchant's point of sale device when payment for the items is complete. In some embodiments, some modifications to the order information may be allowed, e.g. by the user using the user device adding a tip or applying a discount code or otherwise implementing a coupon.

This allows the user to review and possibly edit their order before payment whilst preventing malicious activity. In particular, by sending an indication of the items to be purchased from the point of sale device to the server and storing the order information at the server, the user can only modify the order information by sending a request to the server. This means that any modifications to the order information are visible to the server, which can validate the modifications and/or indicate the modifications to the point of sale device (e.g., for merchant validation). This prevents a malicious user from, for example, surreptitiously removing an item from the order or changing the price of the order, which in turn reduces the risk of theft or underpayment to the merchant and/or the risk of grief to the user. In addition, by notifying the merchant's point of sale device when payment for the order is complete, the merchant can confirm that the items have been paid for (e.g., before providing the purchased products and/or services to the user). This prevents a malicious user from presenting a payment confirmation for another order to the merchant to deceive the merchant into thinking that the items have been paid for, thereby further reducing the risk of theft or underpayment.

In some embodiments, a computer-implemented method is provided. The computer-implemented method may include receiving, at a server from a point of sale device, an indication of one or more items entered into the point of sale device. The computer-implemented method may include storing, at the server, order information for the one or more items, in which the order information may be associated with an identifier for accessing the order information. The computer-implemented method may include sending the order information relating to the one or more items to a user device responsive to receiving, from the user device, a request for the order information identified by the identifier. The method may include modifying the order information at the server responsive to receiving a request for a modification to the order information identified by the identifier. The method may include indicating, to the user device, an update to the order information based on the modified order information. The method may include, responsive to determining that payment for the modified order information has been completed, indicating to the point of sale device that payment for the modified order information has been completed.

The identifier may be obtained by the user device from the point of sale device. The identifier may be obtained by the user device by scanning a machine-readable indicium displayed on a display associated with the point of sale device. The machine-readable indicium may be a quick response (QR) code. The machine-readable indicium may encode a uniform resource locator identifying the order information. The identifier may include a uniform resource locator identifying the order information.

Modifying the order information at the server responsive to receiving the request for the modification to the order information may include modifying the order information responsive to validating, at the server, the requested modification to the order information. Validating, at the server, the requested modification to the order information may include determining that the requested modification complies with one or more rules. The request to modify the order information may include a user identifier. Validating, at the server, the requested modification to the order information may include validating, at the server, the requested modification based on the user identifier. Validating, at the server, the requested modification based on the user identifier may include at least one of: determining that the requested modification relates to a discount code associated with the user identifier, determining that the requested modification relates to a tax exemption associated with the user identifier, or determining that the requested modification relates to a loyalty program to which the user identifier is subscribed.

Modifying the order information at the server responsive to receiving the request for the modification to the order information may include modifying the order information based on a discount code stored on the user device.

The computer-implemented method may include sending, to the point of sale device, an indication of the requested modification to the order information. Modifying the order information at the server responsive to receiving the request for the modification to the order information may include modifying the order information responsive to receiving, from the point of sale device, approval of the requested modification to the order information. The computer-implemented method may include sending, for receipt by the user device, the identifier for the order information stored at the server. Indicating to the point of sale device that payment for the modified order information has been completed may include sending instructions to the point of sale device to update a user interface displayed on a display associated with the point of sale device to reflect that payment has been completed. The order information relating to the one or more items may include, for each of the one or more items, at least one of: an identifier for the respective item, a price of the respective item, a description for the respective item, or an image for the respective item.

The computer-implemented method may include communicating with the user device to enable payment for the modified order information. Determining that payment for the modified order information has been completed may comprise receiving an indication that payment for the modified order information has been completed.

A system is also disclosed that is configured to perform the methods disclosed herein. For example, the system may include at least one processor to directly perform (or cause the system to perform) the method steps. In some embodiments, the system may further include a memory storing processor-executable instructions that are executed by the processor to cause the system to perform the methods disclosed herein.

In another embodiment, there is provided a non-transitory computer readable medium having stored thereon computer-executable instructions that, when executed by a computer, cause the computer to perform operations of the methods disclosed herein.

BRIEF DESCRIPTION OF THE DRAWINGS

Embodiments will be described, by way of example only, with reference to the accompanying figures wherein:

FIG. 2 illustrates a home page of an administrator, according to one embodiment.

FIGS. 8 and 11 are examples of order information displayed on a display associated with a point of sale device according to embodiments of the disclosure.

DETAILED DESCRIPTION

For illustrative purposes, specific example embodiments will now be explained in greater detail below in conjunction with the figures.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 1:
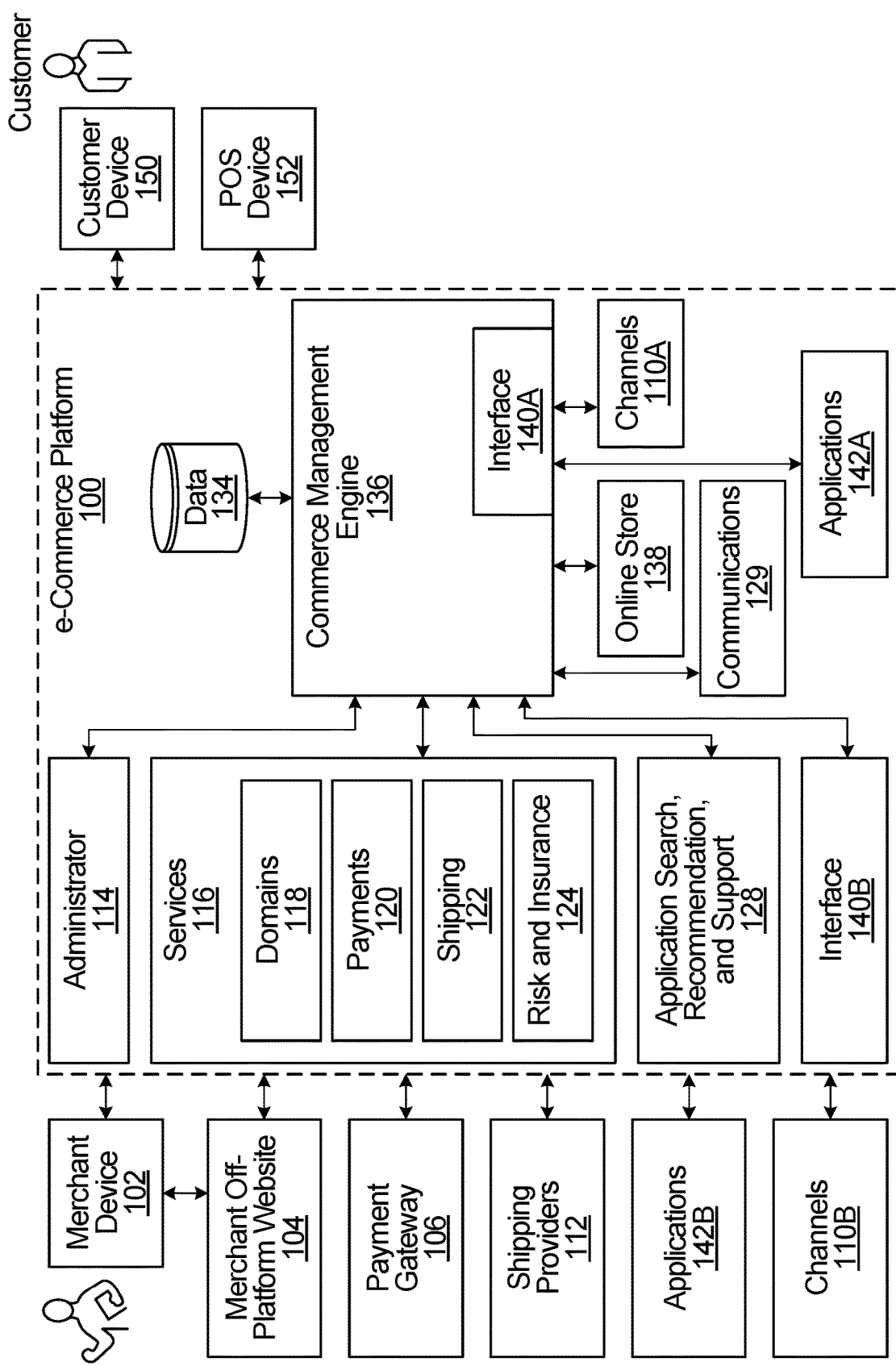
FIG. 1 is a block diagram of an e-commerce platform, according to one embodiment.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Modifying Order Information in the e-Commerce Platform 100

A customer in a retail store may pay for an in-store purchase using a user device, such as a smartphone or wearable device. However, payment systems typically only send the total order amount to the user device, which means the customer cannot view their order on their device before purchasing. In addition, the customer is unable to make any changes to their order using their device. For example, in order to apply a discount code to their purchases, the user may have to read out the discount code to the merchant for the merchant to manually enter into a point of sale device.

Figure 3:
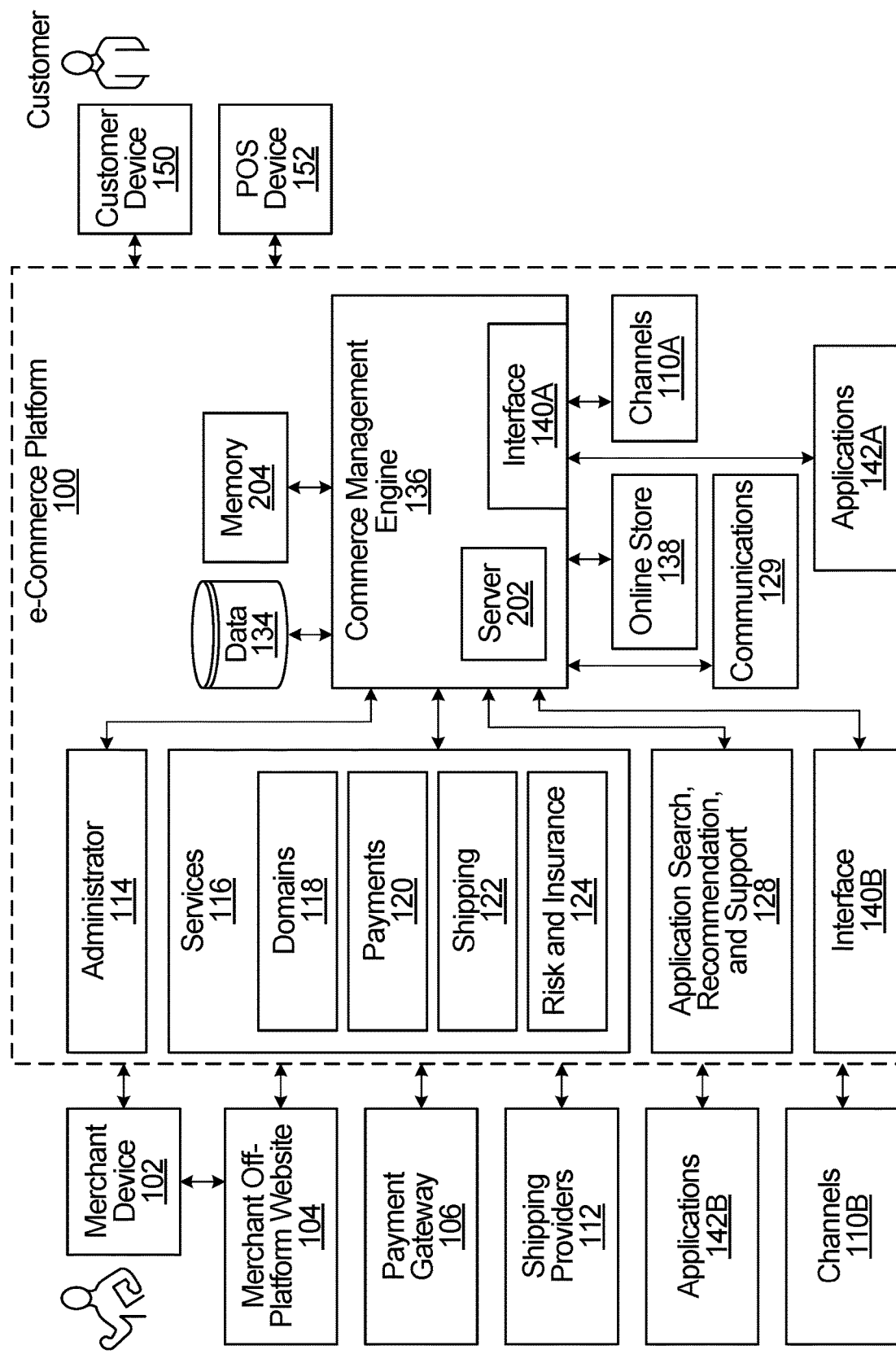
FIG. 3 illustrates the e-commerce platform of FIG. 1, but with a memory and a server.

FIG. 3 illustrates the e-commerce platform 100 of FIG. 1, but with the additions of a server 202 and a memory 204. The server 202 may be embodied as part of the commerce management engine 136. The server 202 performs the methods of managing (e.g., storing, modifying and/or sending) order information disclosed herein. For example, the server 202 may receive an indication of one or more order items entered into a point of sale device (e.g., the point of sale device 152) and store order information for the one or more items (e.g., in the memory 204) as described herein. The server 202 may also modify the order information in response to receiving a request for a modification to order information (e.g., from the customer device 150) as described herein. The server 202 may be implemented by one or more general-purpose processors that execute instructions stored in a memory (e.g. in the memory 204) or stored in another computer-readable medium. The instructions, when executed, cause the server 202 to perform the operations of the server 202, e.g., operations relating to the management of order information for one or more items entered into the point of sale device 152. Alternatively, some or all of the server 202 may be implemented using dedicated circuitry, such as an application specific integrated circuit (ASIC), a graphics processing unit (GPU), or a programmed field programmable gate array (FPGA). In some embodiments, the server 202 may be located inside the e-commerce platform 100 but external to, and coupled to, the commerce management engine 136. In some embodiments, the server 202 may instead be located externally to the e-commerce platform 100 and possibly coupled to the commerce management engine 136.

The memory 202 of the e-commerce platform 100 of FIG. 3 may be used to store the order information. The memory 202 may also be used to store one or more rules for validating a requested modification to the order information as described herein. In some embodiments, the memory 204 may be part of the server 202.

Although the server 202 in FIG. 3 is illustrated as a distinct component of the e-commerce platform 100 in commerce management engine 136, this is only an example. The server 202 could also or instead be provided by another component residing within or external to the e-commerce platform 100. In some embodiments, either or both of the applications 142A-B may provide a server 202 that implements the functionality described herein. The location of the server 202 is implementation specific. In some implementations, the server 202 is provided at least in part by an e-commerce platform, either as a core function of the e-commerce platform or as an application or service supported by or communicating with the e-commerce platform.

In some embodiments, at least a portion of the server 202 could be implemented in a point of sale device (e.g. point of sale device 152). For example, the point of sale device 152 could store and run at least some of the server 202 locally as a software application.

Although the embodiments described herein may be implemented using the server 202 in e-commerce platform 100, the embodiments are not limited to the specific e-commerce platform 100 of FIGS. 1 to 3 and could be used in connection with any e-commerce platform. Also, the embodiments described herein need not necessarily be implemented in association with an e-commerce platform, but might instead be implemented as a standalone component or service. Therefore, the embodiments below will be described more generally.

Example System for Modifying Order Information

Figure 4:
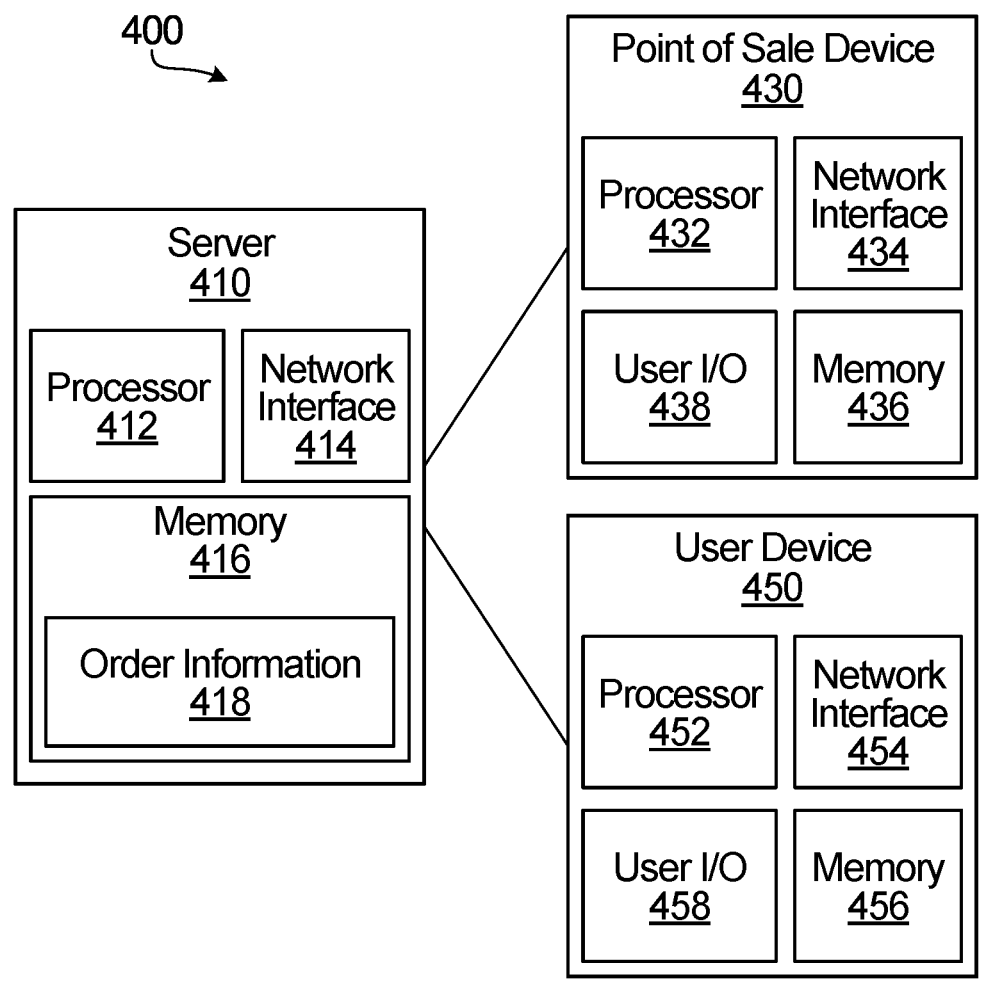
FIG. 4 illustrates a system according to embodiments of the disclosure.

FIG. 4 illustrates a system 400 according to embodiments of the disclosure. The system 400 includes a server 410, a point of sale device 430 and a user device 450. The server 410 is connected to the point of sale device 430 by a network (not illustrated). The server 410 is also connected to the user device 450 by a network (not illustrated), which might be the same or a different network to the network connecting the point of sale device 430 to the server 410. Only a single point of sale device 430 and a single user device 450 are illustrated, but it will be appreciated that the server may, in general, be connected to one or more point of sale devices 430 and/or one or more user devices 450.

The server 410 includes a processor 412, a network interface 414 and a memory 416. The processor 412 directly performs, or instructs the server 410 to perform, the operations described herein of the server 410, e.g., operations such as receiving an indication of one or more items, storing order information for the one or more items, modifying the order information etc. The processor 412 may be implemented by one or more general purpose processors that execute instructions stored in a memory (e.g. in memory 416) or stored in another computer-readable medium. The instructions, when executed, cause the processor 412 to directly perform, or cause the server 410 to perform the operations described herein. In other embodiments, the processor 412 may be implemented using dedicated circuitry, such as a programmed FPGA, a GPU, or an ASIC The network interface 414 is for communicating over a network, e.g. to communicate with the point of sale device 430 and/or the user device 450 described below. The network interface 414 may be implemented as a network interface card (NIC), and/or a computer port (e.g., a physical outlet to which a plug or cable connects), and/or a network socket, etc., depending upon the implementation.

The server 400 further includes the memory 416. A single memory 416 is illustrated in FIG. 3, but in implementation the memory 416 may be distributed. As illustrated, the memory 416 may be for storing order information 418. The order information 418 is described in more detail below.

In some embodiments, the server 410 may be implemented inside of an e-commerce platform (e.g., inside e-commerce platform 100). For example, the server 410 may be the server 202. In some embodiments, the processor 412, memory 416, and/or network interface 414 may be located outside of the server 410.

The point of sale device 430 is for entry of one or more items to be purchased by a user (e.g., a user of the user device 450). The user may also be referred to as a customer (e.g., a customer of the merchant operating the point of sale device 430), a buyer or a purchaser (e.g., a buyer or purchaser of the one or more items). The point of sale device 430 may alternatively be referred to as a merchant device, for example.

The point of sale device 430 includes a processor 432, a network interface 434, a memory 436, and a user input-output (user I/O) 438. The processor 432 directly performs, or instructs the point of sale device 430 to perform, the operations of the point of sale device 430 described herein, e.g. enabling the merchant to enter, via the use of user I/O (or user IO) 438, one or more items, receiving an indication that payment has been completed, and/or indicating to the merchant, via the use of the user I/O 438, that payment has been completed. The processor 432 may be implemented by one or more general purpose processors that execute instructions stored in a memory (e.g. memory 436) or stored in another computer-readable medium. The instructions, when executed, cause the processor 432 to directly perform, or instruct the point of sale device 430 to perform, the operations described herein. In other embodiments, the processor 432 may be implemented using dedicated circuitry, such as a programmed FPGA, a GPU, or an ASIC.

The network interface 434 is for communicating with the server 410 over the network. The structure of the network interface 434 will depend on how the point of sale device 430 interfaces with the network. For example, the network interface 434 may comprise a transmitter/receiver with an antenna to send and receive wireless transmissions to/from the network. This may be particularly appropriate in examples in which the point of sale device 430 is a mobile phone, laptop, or tablet. If the point of sale device 430 is connected to the network with a network cable, the network interface 430 may comprise a NIC, and/or a computer port (e.g. a physical outlet to which a plug or cable connects), and/or a network socket, etc. This may be particularly appropriate in examples in which the point of sale device 430 is a personal computer or a cash register (e.g. a till).

The point of sale device 430 also includes the memory 436. A single memory 436 is illustrated in FIG. 4, but in implementation the memory 436 may be distributed. The memory 436 may be for storing one more items entered into the point of sale device 430 (e.g. entered via the user I/O 438).

The point of sale device 430 also includes the user I/O 438. The user I/O 438 may include any device that allows the merchant to input information into the point of sale device 430 and/or any device for outputting information, at the point of sale device 430, to the merchant. The user I/O 438 may include a display screen (which may be a touch screen), and/or a keyboard, and/or a mouse, and/or a barcode reader for reading item barcodes, etc., depending upon the implementation. The user I/O 438 may be used to present a user interface to the merchant, e.g. via a display screen.

The user device 450 includes processor 452, a network interface 454, a memory 456, and a user I/O (or user IO) 458. The processor 452 directly performs, or instructs the user device 450 to perform, the operations of the user device 450 described e.g. receiving the order information, displaying order information to the user and enabling payment for the order information. The processor 452 may be implemented by one or more general-purpose processes that execute instructions stored in a memory (e.g. memory 456) or stored in another computer readable medium. The instructions, when executed, cause the processor 452 directly perform, or instruct the user device 450 to perform, the operations described herein. In other embodiments the processor 452 may be implemented using dedicated circuitry, such as a programmed FPGA, a GPU, or an ASIC.

The network interface 454 is for communicating with the server 410 over the network. The structure of the network interface 4504 will depend on how the user device 450 interfaces with the network. For example, the network interface 454 may comprise a transmitter/receiver with an antenna to send and receive wireless transmissions to/from the network. This may be particularly appropriate in examples in which the user device 450 is a mobile phone, laptop, wearable device or tablet. If the user device 450 is connected to the network with a network cable, the user device 450 may comprise an NIC and/or a computer port (e.g. a physical outlet to which a plug or cable connects), and/or a network socket, etc.

The user device 450 also includes the memory 456. A single memory 456 is illustrated in FIG. 4, but in implementation the memory 456 may be distributed. The memory 456 may be for storing order information received from the server 410.

The user device 450 also includes the user I/O 458. The user I/O 458 may include any device that allows the user to input information into the user device 450 and/or any device for outputting information, at the user device 450, to the user. The user I/O 458 may include a display screen (which may be a touch screen), and/or a keyboard, and/or a mouse, and/or a camera, etc., depending upon the implementation. The user I/O 458 may be used to present a user interface to the user, e.g. via a display screen.

Modifying Order Information

Figure 5:
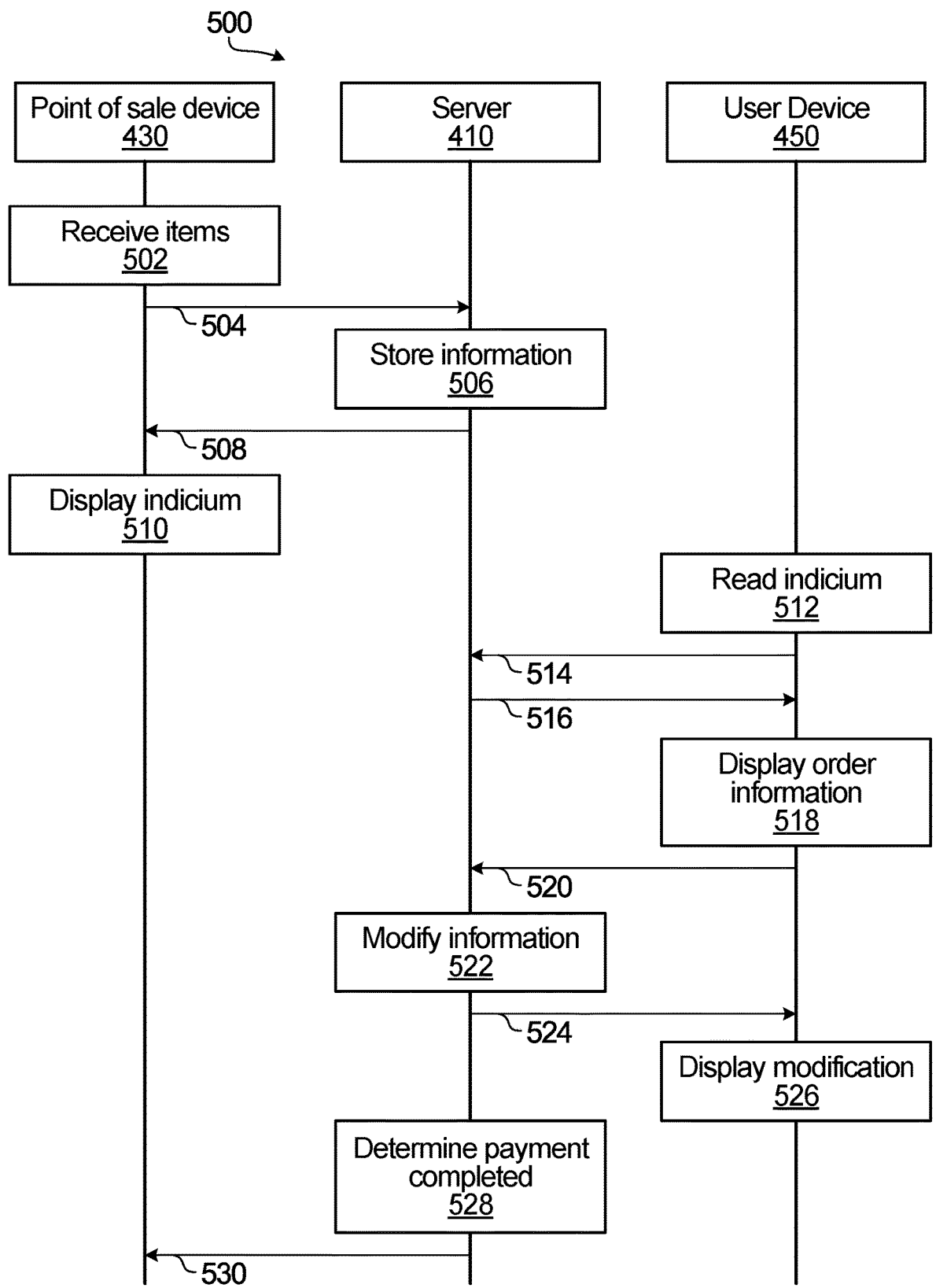
FIG. 5 illustrates signalling between a point of sale device, a server and a user device in a method according to embodiments of the disclosure.

FIG. 5 illustrates signalling between the point of sale device 430, the server 410, and the user device 450 in a method 500.

The method 500 may begin with the point of sale device 430 receiving one or more items in step 502. The one or more items may include any item that is available for purchase (e.g., any item that can be purchased by the user). The one or more items may, for example, include one or more goods (e.g., one or more products) and/or one or more services.

It will be appreciated that there are many ways the one or more items may be entered into the point of sale device 430. The one or more items may be entered into the point of sale device 430 manually by a merchant. In some embodiments, the point of sale device 430 may include a touchscreen and the one or more items may be entered into the point of sale device 430 using the touchscreen. A merchant may, for example, select one or more icons corresponding to the one or more items on the touchscreen. The touchscreen may be included in the user I/O 438 of the point of sale device 413, for example.

In some embodiments, the point of sale device 430 may be provided with (e.g. may include or may be in communication with) an indicium reader, such as a barcode reader or a QR code reader. The one or more items may be entered into the point of sale device 430 by scanning one or more indicia with the indicium reader. Each indicia may, for example, be attached to a respective product (e.g., in a retail store). In some embodiments, the one or more items may be entered into the point of sale device 430 by scanning one or more tags, such as RFID tags, with a sensor (e.g., an RFID sensor or reader) associated with the point of sale device 430. Each tag may, for example, be attached to or embedded in a respective product (e.g., in a retail store). The sensor may be included in the point of sale device 430 or connected to (e.g., in communication with) the point of sale device 430.

In some embodiments, the user may be in a physical retail store. Thus, for example, the user may pick up one or more products in the retail store and present the one or more products to the merchant for entry into the point of sale device 430. Alternatively, the user may say indicators of (e.g., names of) the one or more items to the merchant for the merchant to enter into the point of sale device 430. For example, the user may order one or more drinks from a barista in a café and the barista may enter the drinks into the point of sale device 430.

In some embodiments, the user might not be physically present (e.g. the user might not be in the same place as the point of sale device). For example, the user may be remote, and the merchant may enter the one or more items into the point of sale device 430.

In step 504, the point of sale device 430 may send an indication of the one or more items to the server 410. The indication may be sent over a network between the point of sale device 430 and the server 410. In some examples, the indication may be sent in a Hypertext Transfer Protocol (HTTP) message such as an HTTP request. The term "HTTP" as used herein also covers Hypertext Transfer Protocol Secure (HTTPS) and any other variation or extension of HTTP.

The indication may take any suitable form. In some examples, the indication may include, for example, a respective identifier for each of the one or more items. The point of sale device 430 and the server 410 may, for example, be configured with a repository of identifiers for items which are available for purchase via the point of sale device 430. By sending the respective identifier for an item to the server 410, the point of sale device 430 may thus indicate the item to the server 410.

In step 506, the server 410 may store order information 418 relating to the one or more items in the memory 416 at the server 410.

The order information 418 may include item-specific information. For example, the order information may include, for each of the one or more items, at least one of: an identifier for the respective item, a price of the respective item, a description for the respective item, a quantity of the respective item, or an image for the respective item. The identifier for an item may or might not be a name of the item. The identifier may, for example, be an item code (e.g., a serial number, SKU, or barcode) identifying the item.

The order information 418 may, additionally or alternatively, include information relating to the order as a whole. In this context, the order may include the one or more items, as well as one or more discounts and/or one or more additions. The order information 418 may, for example, include a total price of the order. The total price may include, for example, the sum of the respective prices of the one or more items, subject to any applicable discounts (e.g., as specified by any of: an offer, an account credit, a discount code, and/or a discount scheme) and any applicable additions (e.g., any of: a tip, a tax, a surcharge, a shipping fee, and/or a handling fee). The order information 418 may include one or more rewards (e.g., points, credits or any other suitable rewards) associated with a loyalty program, such as a reward program. The one or more rewards may be the rewards to be accrued by the user (e.g., to be associated with an account of the user) when payment for the order is completed. The one or more rewards may be based on, for example, the total price of the order. In some embodiments, the order information may include information associated with the user purchasing the one or more items, e.g. an identity of the user and/or user billing information and/or user shipping information, etc.

The order information 418 may be associated with an identifier for accessing the order information 418 at the server. The identifier may be generated by the server 410 (e.g., when the order information 418 is generated). Alternatively the identifier may be generated by the point of sale device 430 and sent to the server 410 (e.g. in step 504).

The identifier for accessing the order may take any suitable form. The identifier may indicate the location of the order information 418 on the server 410. Thus, for example, the identifier may indicate the location of the order information 418 in the memory 416. In some embodiments, the identifier may be a code that identifies the order information 418. For example, the identifier may be a code (e.g., a unique code) to be entered into a specific application or website to access the order information 418. The code may comprise one or more characters (e.g., numbers, letters and/or symbols). The code may be an alphanumeric code. In some embodiments, the identifier may comprise an address link (e.g., a web address link or a uniform resource indicator), such as a uniform resource locator (URL) or a deep link (e.g., a mobile deep link), or part of an address link. The identifier may comprise a code for constructing an address link for accessing the order information 418. For example, the identifier may comprise a base 64 encoded ID for encoding in the deep link shop://stuffs/[base 64 encoded ID].

Although the identifier may be for accessing the order information 418, modification of the order information 418 by changing the identifier may be prevented. The identifier might not, for example, comprise a serialization of the one or more items. As such, in some embodiments, the order information 418 on the server 410 cannot be modified by changing the identifier or by, for example, changing a URL in which the identifier is carried. This may prevent a user from changing the order information 418 directly, which reduces the risk of malicious activity. Instead, the order information 418 stored on the server 410 may be modifiable on request only. This is discussed in more detail below in respect of steps 518-524.

In some embodiments, the order information 418 may be generated by the server 410 based on the indication of the one or more items received from the point of sale device 430. The server 410 may retrieve some or all of the order information 418 from memory (e.g., from the memory 416) based on the indication of the one or more items received from the point of sale device 430 in step 504. The server 410 may store in memory item-specific information (e.g., the item-specific information described above, such as a price, description etc.) for a plurality of items, in which each item is identified by a respective identifier. The server 410 may generate the order information 418 by retrieving item-specific information for a respective item from memory based on an item identifier received from the point of sale device 430.

The server 410 may, additionally or alternatively, request some or all of the order information 418 from another server (e.g., a third-party server). The server 410 may send a request, to another server, for item-specific information, in which the request includes a respective identifier for each of the one or more items. The server 410 may generate the order information 418 based on the item-specific information received from the other server. For example, the server 410 may receive a respective item image for each of the one or more items from another server.

The server 410 may receive some of the order information 418 from the point of sale device 430 (e.g., in step 504). For example, the point of sale device 430 may, in step 504, send a respective identifier and a respective price for each of the one or more items to the server 410.

The server 410 may calculate some of the order information 418 based on information from memory, another server and/or the point of sale device 430. For example, the server 410 may calculate a total price of the order based on the respective prices of the one or more items obtained from memory, another server and/or the point of sale device 430. The server 410 may, for example, calculate a reward based on the total price of the order.

In some embodiments, the point of sale device 430 may generate the order information 418 and, in step 504, send the order information 418 to the server 410 as an indication of the one or more items. The server 410 may thus, in step 504, receive the order information 418 from the point of sale device 430, in which the order information 418 is generated by the point of sale device 430 based on the one or more items entered into the point of sale device 430.

In step 508, the server 410 may send the identifier for the order information 418 to the point of sale device 430 for communication to the user device 450. The server 410 may thus send, for receipt by the user device 450, the identifier for the order information 418 stored at the server 410. The server 410 may send the identifier over the network between the point of sale device 430 and the server 410. The server 410 may send the identifier in an HTTP message, such as an HTTP response message.

The point of sale device 430 may, in step 510, display an indicium based on the identifier on a display associated with the point of sale device 430. The display may form part of the user I/O 438 at the point of sale device 430, for example. The display may be integral to the point of sale device 430 or connected to the point of sale device 430.

The point of sale device 430 may encode the identifier in the indicium. That is, the point of sale device 430 may encode the identifier to obtain the indicium. The indicium may be any machine-readable indicium, such as a visible machine-readable indicium. The indicium may include one or more of a QR code, a barcode, machine-readable text (e.g., text that can be read using Optical Character Recognition, OCR), or any other suitable indicium. For example, the point of sale device 430 may encode the identifier in a QR code.

In some examples, encoding the identifier in an indicium may involve constructing an address link (e.g., a web address link) using a template and the identifier, and encoding the address link in the indicium. The address link may be a uniform resource indicator (URI), such as a URL or a deep link. The deep link may be a mobile deep link, which links to a specific location within an application at the user device. In some examples, encoding the identifier may involve constructing a URL using a template URL and the identifier, and encoding the URL in the indicium. For example, the point of sale device 430 may construct the URL www.shop.com/order/1234567 by inserting the identifier 1234567 into a template URL www.shop.com/order/[identifier]. In some examples, encoding the identifier in indicium may involve constructing a mobile deep link using a template mobile deep link and the identifier, and encoding the mobile deep link in the indicium. For example, the point of sale device 430 may construct the deep link shop://order/1234567 by inserting the identifier 1234567 into a template deep link shop://order/[identifier].

Alternatively, the point of sale device 430 may have received in the indicium from the server 410. For example, the server 410 may encode the identifier in an indicium (e.g., using any of the operations described above) and, in step 508, send the indicium to the point of sale device 430.

The user device 450 may, in step 512, read the indicium displayed on the display associated with the point of sale device 430. The indicium may be read using a camera at (e.g., included in or connected to) user device 450. Thus, for example, a camera at the user device 450 may be used (e.g., by the user) to read a QR code displayed on the display associated with the point of sale device 430. The indicium may be read (e.g., scanned, imaged or captured) using any suitable means at the user device 450.

By displaying the machine-readable indicium, such as a QR code, on the display associated with the point of sale device 430 and reading the machine-readable indicium with the user device 450, the identifier for the order information 418 at the server 410 can be easily communicated to the user device 450.

Based on the indicium read in step 512, the user device 450 may, in step 514, send a request to the server 410 for the order information. That is, the user device 450 may, in step 514, send a request for access to the order information at the server 410. The request may be sent over a network between the user device 450 and the server 410, which might be the same network or a different network to the network between the point of sale device 430 and the server 410. The request may include at least part of (e.g., some or all of) the identifier encoded in the indicium.

The request may be included in an HTTP message, such as an HTTP request. In particular examples, the user device 450 may send the request in HTTP GET request. The HTTP request may include, for example, a domain associated with the server 410 and a location of the order information on the server 410. The domain may be included in a header of the HTTP request. The location may be located in a request line of the HTTP request. The domain and/or the location may be based on the identifier. Thus, for example, the identifier may include a URL which specifies the domain (e.g., identifier the server 410) and the location of the order information on the server 410. In another example, a URL may be constructed based on the identifier and a URL template as described herein, and the identifier may indicate the location of the order information on the server and the URL template may indicate (e.g., may include) the domain.

One or more applications may be used at the user device 450 to read the indicium and/or send the request to the server 410 in steps 512 and 514. In some embodiments, the same application may be used to read the indicium and send the request to the server 410. For example, the user may open an application (e.g., an application associated with the merchant) on the user device 450 and, in step 512, use the application to read the indicium. The application may, based on the indicium, send the request to the server 410 in step 514. For example, the indicium may encode the identifier 1234567 and the request sent by the application to the server 410 may include the identifier 1234567. In some examples, the application may construct a URL based on the identifier and a URL template (e.g., a URL template stored at user device 450) and send the request including the URL. The URL may be constructed as described above in respect of step 510.

In other embodiments, an application may be used to read the indicium and another application may be used to send the request to the server 410. The indicium may be read using an indicium reader (e.g., a QR code reader) at the user device 450 to obtain an address link encoded in the indicium. Based on the address link, an application at the user device 450 may send the request to the server 410. For example, the indicium may be read using an indicium reader (e.g., a QR code reader) at the user device 450 to obtain a URL encoded in the indicium. Based on the URL, a browser (e.g., a web browser) at the user device 450 may send the request to the server 410. As many user devices 450 may already be provided with a web browser and an indicium reader, such as a camera, this may avoid the need to implement a specialist application at the user device 450 to access the order information.

In another example, the indicium may be read using an indicium reader at the user device 450 to obtain a mobile deep link encoded in the indicium. Responsive to reading the indicium in step 512, the user device 450 may launch an application at the user device 450 that is associated with the mobile deep link. The application may be associated with the merchant. The application may be caused to send the request to the server for the order information in step 514. For example, the deep link shop://order/1234567 may cause the user device 450 to launch a "Shop" application and send a request to the server for order information associated with the identifier 1234567.

In another example, an indicium reader at the user device 450 may be used to read the indicium and obtain the identifier. The user device 450 may output the identifier using the user I/O 458 and the user may manually enter the identifier into an application (e.g., a particular application, or a website in a web browser) at the user device 450. The user may manually enter the identifier into the application by, for example, typing the identifier out or copying and pasting an identifier displayed on a display of the user device 450.

In general, any suitable application at the user device 450 may be used to read the indicium and/or send the request to the server 410 in steps 512 and 514.

In some embodiments, the request may be sent automatically by the user device 450 in step 514 in response to reading the indicium in step 512. In other embodiments, the user device 450 may send the request responsive to input (e.g., confirmation) from the user. The input may be received at the user I/O 458 of the user device 450, for example (e.g., at a touchscreen of the user device 450). For example, responsive to reading the indicium in step 512, the user device 450 may display an address link, such as a URL, encoded in the indicium to the user (e.g., using a display at the user device 450). The user may click (or otherwise activate) the address link, causing the request to be sent to the server 410 in step 514. In some examples, the user device 450 may display a deep link encoded in the indicium to the user and the user may click (or otherwise activate) the deep link to, causing the application associated with the deep link to be launched and causing the application to send the request to the step 410.

In other embodiments, the identifier may be communicated to the user device 450 by other means.

In some embodiments, rather than displaying an indicium in step 510, the point of sale device 430 may transmit the identifier to the user device 450. For example, the point of sale device 430 may transmit the identifier to the user device 450 using near field communication (NFC). The merchant may, for example, ask the user to present the user device 450 to the point of sale device 430 (e.g. to hold their user device 450 within a certain distance of the point of sale device 430). In general, any suitable communication protocol may be used such as, for example, Bluetooth, NFC or Wi-Fi (e.g., Wi-Fi direct).

The point of sale device 430 may, for example, encode the identifier in an address link, such as a URL or deep link, for transmission to user device 450 (e.g., as described above in respect of the indicium).

The user device 450 may receive the transmitted identifier and send the request in step 514 in accordance with the operations described above with respect to step 514.

In other embodiments, the server 410 may transmit the identifier for receipt by the user device 450 without transmitting the identifier to the point of sale device 430. For example, the server 410 may cause a message including the identifier to be sent to a telephone number and/or e-mail address associated with the user device 450. The message may include the identifier for input into an application or website by the user. The message may include an address link such as a URL or deep link (e.g., a mobile deep link) which, upon user interaction, may direct the user to a web browser or other application implemented on the user device 450.

The server 410 may receive the telephone number and/or e-mail address associated with the user device 450 from the point of sale device 430. For example, the merchant or the user may enter the telephone number and/or e-mail address into the point of sale device 430. In another example, a user identifier may be entered into the point of sale device 430 (e.g., by reading a user account card, such as a loyalty or reward card). The user identifier may alternatively be referred to as a customer identifier. The user identifier may be associated with a user account. The user account may alternatively be referred to as a customer account or a shopping account. The user account may be with the merchant, an online store operated by the merchant, a payment service, a loyalty or reward scheme and/or an e-commerce platform (e.g., an e-commerce platform used by the merchant). Some or all of this user information (e.g. the telephone number and/or email address) may be stored as part of the order information.

The user identifier may be used by the point of sale device 430 or the server 410 to retrieve the telephone number and/or e-mail address associated with the user identifier. For example, the point of sale device 430 may send the user identifier to the server 410 and the server may retrieve the telephone number and/or e-mail address (e.g., from the memory 416 or from another server) based on the user identifier.

In another example, the server 410 may cause the identifier to be sent to the user device 450 in a push notification. An application at the user device 450 may be subscribed to push notifications from an application server. The server 410 may, for example, receive the user identifier described above from the point of sale device 430 and, based on the user identifier, instruct the application server to send a push notification including the identifier to the user device 450. Alternatively, the server 410 may be an application server to which an application at the user device 450 is described.

The push notification may include the identifier for input into an application (e.g., the application which caused the push notification to be displayed) or website by the user. The push notification may include an address link such as a URL or deep link (e.g., a mobile deep link) which, upon user interaction, may direct the user to a web browser or other application implemented on the user device 450. For example, the deep link may direct the user to the application which caused the push notification to be displayed.

In step 516, the server 410 may send the order information 418 to the user device 450. The server 410 may send the order information 418 in response to receiving the request in step 514. The order information 418 may be sent over the network between the user device 450 and the server 410. The order information 418 may be sent in an HTTP message, such as an HTTP response. The order information 418 may be sent over a network, such as the same network over which the request 514 was sent.

The server 410 may send some or all of the order information 418 stored at the server 410. For example, the server 410 may send respective names, prices and quantities for the one or more items to the user device 450. The server 410 may send a total price of the order to the user device 450. Alternatively, the server 410 may send the respective prices for the one or more items to the user device 450 for the user device 450 to use to calculate the total price of the order. The server 410 may send, for each of the one or more items, a respective identifier to the user device 450. The server 410 may send the identifiers for the user device 450 to use to retrieve item-specific information e.g., from a memory of the user device 450 (e.g., the memory 456) and/or another server (e.g., a third party server).

The order information 418 may be sent to the user device 450 for display on a display associated with the user device 450 (e.g., for display on a user interface displayed on the display). The order information 418 may be sent in a web page (e.g., an HTML, document that may also include JavaScript and/or Cascading Style Sheets, CSS) to be displayed at the user device 450.

In step 518, the user device 450 may display the order information 418 on a display associated with (e.g., integral to or connected to) the user device 450. The display may form part of the user I/O 458. The display may, for example, form part of a touchscreen at the user device 450.

The user device 450 may display the order information 418 in a user interface of an application. The application may be a web browser or another application, such as a web application or native application. In some embodiments, the user device 450 may display the order information 418 in a user interface of the same application which was used to read the indicium in step 512 and/or send the request in step 514. The same application may be specific to the merchant and/or an e-commerce platform associated with (e.g., used by) the merchant. The e-commerce platform may be the e-commerce platform 100. In some examples, the user device 450 may display the order information 418 on a web page in a browser. The web page may be received in step 518 or may be constructed, by the user device 450, based on the order information 418 received in step 518.

The user device 450 may, additionally or alternatively, output the order information 418 to the user using other means. The user device 450 may, for example, output the order information 418 using a speaker (e.g. in an earbud or headset) that forms part of the user I/O 458. The user device 450 may, in general, output the order information 418 to the user using any aspect of the user I/O 458.

As mentioned above, the server 410 may send some or all of the order information 418 to the user device 450. In some embodiments, the user device 450 may receive all of the information to be output to the user from the server 410. In some embodiments, the user device 450 may retrieve information from memory and/or from another server (e.g., a third party server) to output (e.g., to display) in step 450. For example, the user device 450 may only receive item identifiers for the one or more items from the server 410 and retrieve, based on the item identifiers, item names, descriptions, prices and/or images (e.g., from another server or from a memory, such as the memory 456 of the user device 450). Thus, the user device 450 might only receive limited information from the server 410 and request further information from another (third-party) server.

Figure 6:
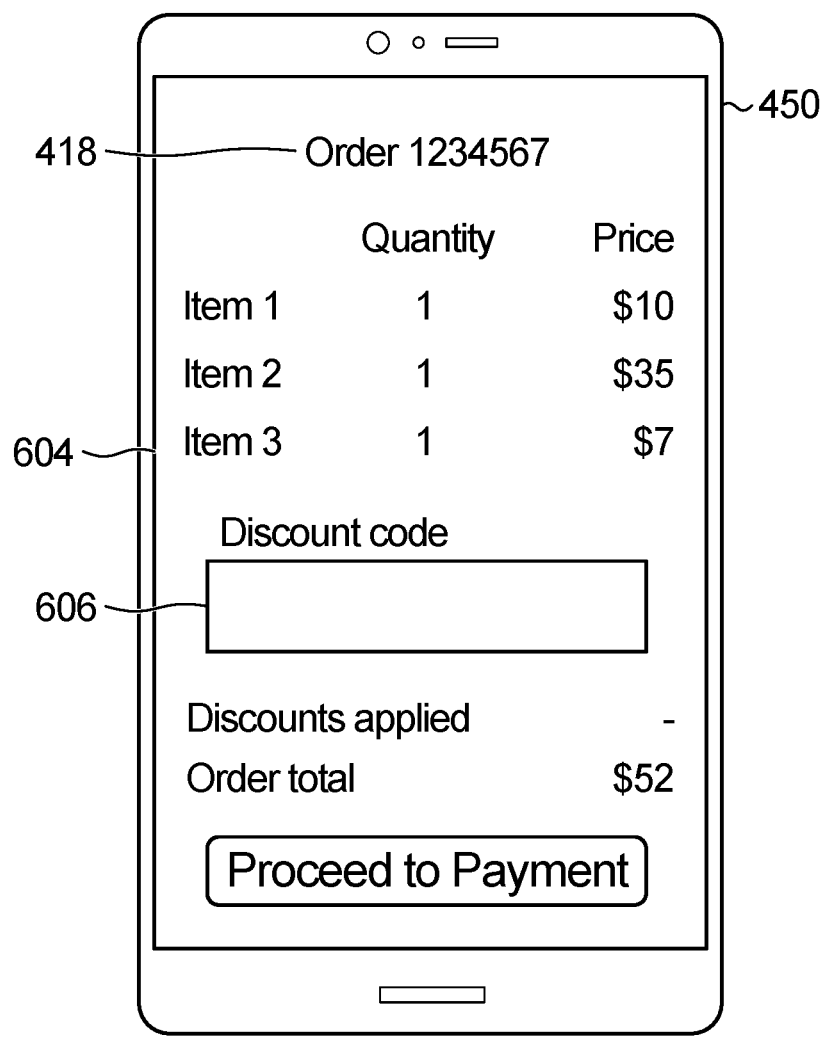
FIGS. 6, 7, 9 and 10 are examples of order information displayed on a display associated with a user device according to embodiments of the disclosure.

FIG. 6 shows an example of order information 418 displayed on a display 604 of the user device 450. In this example, the order information 418 includes an identifier for the order information 418 (1234567), three items with respective names (Item 1, Item 2, and Item 3), quantities (1, 1, and 1) and prices ($10, $35, and $7). The order information 418 also includes an order total ($52). A text entry field 606 for receiving a discount code entered by the user is also shown on the display 604.

In step 520, the user device 450 sends a request to the server 410 for a modification to the order information 418 identified by the identifier. The request may be sent over the network between the server 410 and the user device 450. The request may be sent in an HTTP message such as an HTTP request. In other embodiments, the request may come from (e.g., be initiated by or received from) another device (not shown), or may originate from the server 410 itself (e.g. from another process or program running on the server 410).

In some embodiments, the request may be sent based on information entered by the user. The request may be sent responsive to the information being entered by the user.

Figure 7:
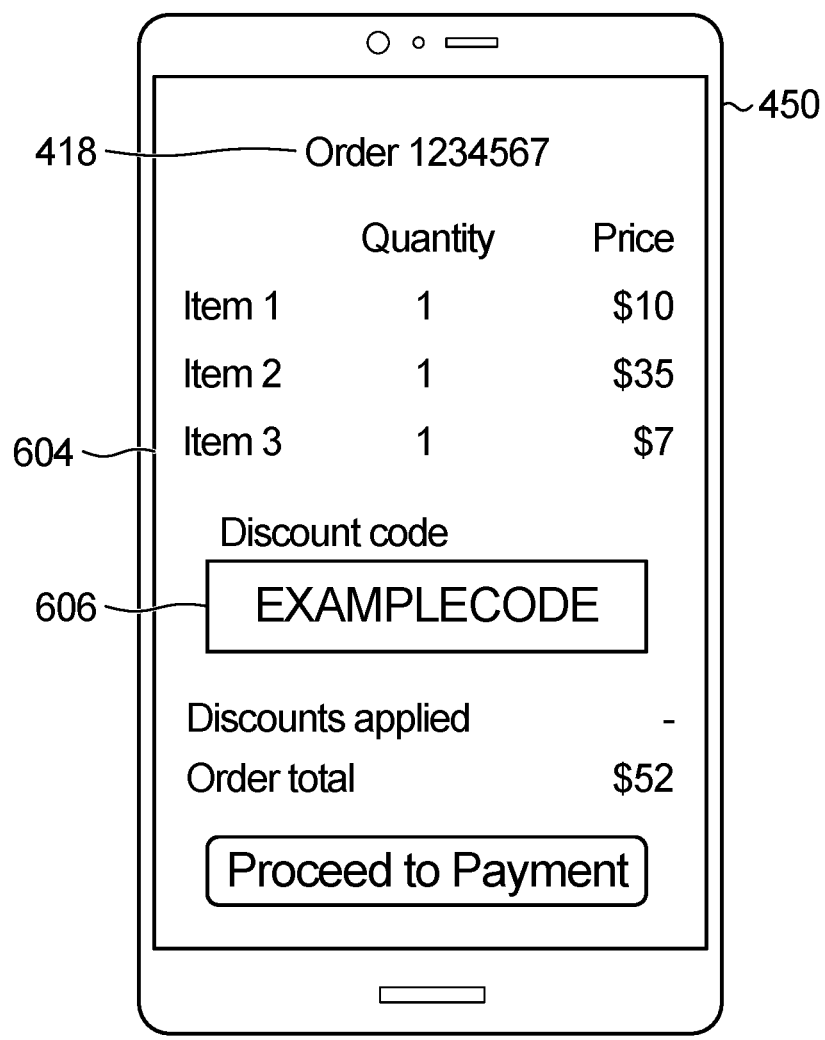

Returning to the example shown in FIG. 6, the user may input the discount code EXAMPLECODE into the text entry field 606, resulting in the display shown in FIG. 7. This may cause the user device 450 to send a request to modify the order information 418 based on the discount code. In another example, the user may log into an account at the user device 450, prompting the user device 450 to send a request to modify the order information 418 based on a user identifier associated with the account.

In some embodiments, the request may be sent based on information stored at the user device 450 (e.g., information stored in the memory 456). For example, the user may have previously logged into an account at the user device 450 and the user device 450 may send the user identifier, stored at the user device 450, that is associated with the account.

In some embodiments, the user device 450 may determine a modification to be made based on the information entered by the user and/or the stored information. For example, the user account identified by the user identifier may indicate that the user is eligible for a tax exemption (e.g., as self-reported by the user) and the user device 450 may request, in step 520, modification of the order information 418 based on the tax exemption. In another example, the user account identified by the user identifier may indicate that the user is eligible for a discount and the user device 450 may request, in step 520, modification of the order information 418 based on the discount. In another example, the user account identified by the user identifier may indicate that the user is eligible for a reward program (e.g., a loyalty program, such as a points program) and the user device 450 may request, in step 520, modification of the order information 418 based on the loyalty program.

In some embodiments, the request may include the information stored at the user device 450 and/or the information entered by the user. The request may include, for example, the user identifier described above.

In some embodiments, the user device 450 might not explicitly request the modification in step 520. For example, the user device 450 may send the user identifier to the server 410 in step 520 without any explicit request for a modification to the order. However, the server 410 may still interpret the receipt of the user identifier as a request for a modification to the order, since it may implicitly indicate a modification is to be made. For example, the user identifier may be associated with a particular discount (e.g., free shipping) which indicates that the order information 418 should be modified to account for the discount.

In step 522, the server 410 may modify the order information 418 to obtain modified order information 418. The modification may be based on the request received in step 520. The modified order information 418 and the order information 418 may be accessed, at the server 410, using the same identifier.

The modification may involve one or more of: changing a value of part of the order information 418 (e.g., changing a quantity of an item), adding or removing an item, adding or removing a discount (e.g., by adding or removing a discount code) or any other suitable modification. In some embodiments, the server 410 may modify the order information 418 based on a user identifier (e.g., included in the request received in step 520 and/or the request received in step 514). The server 410 may modify the order information 418 based on an account associated with the user identifier. For example, the server 410 may modify the order information 418 based on one or more of: a history of the account (e.g., a purchase history), one or more credits applied to the account (e.g., due to a loyalty program or a refund on the account), a reward program to which the account is subscribed, a tax exemption associated with the account, or a discount associated with the account.

The server 410 may modify the order information 418 responsive to validating, at the server 410, the requested modification to the order information 418. The server 410 may thus determine whether or not to perform the requested modification. The server 410 might not perform the requested modification responsive to the requested modification failing validation. As such, the requested modification may be prevented from being made in response to the modification failing validation at the server 410.

By validating the requested modification at the server 410, the server 410 can control modification of the order information 418. This can prevent, for example, a malicious user from making changes to the order without the merchant realising, which reduces the risk of theft or underpayment. The server 410 may validate the modification by determining the requested modification complies with one or more rules. The server 410 may thus, for example, compare the requested modification to the one or more rules to determine whether requested modification is permitted.

In some embodiments, the one or more rules may indicate that one or more parts (e.g., elements or attributes) of the order information 418 may be modified. Each of the one or more parts that may be modified may be referred to as a mutable part of the order information 418. For example, the order information 418 may include a tip amount (e.g., as a percentage of the order total or absolute value). The tip amount may be a mutable part of the order information 418 such that, responsive to receiving a request to modify the tip amount in step 520, the server 410 may modify the tip amount (e.g., in accordance with an amount or change in amount included in the request). Examples of parts of order information 418 that may be mutable include: a tip amount, a donation amount (e.g., as a percentage of the order total or absolute value), a discount code, a tax exemption, a delivery or shipping option, and/or a loyalty program.

The one or more rules may indicate that the one or more parts (e.g., elements or attributes) of the order information 418 may not be modified. That is, modification of the one or more parts may be prevented. Each of the one or more parts that may not be modified may be referred to as an immutable part of the order information 418. Thus, the order information 418 may only be partially mutable (e.g., partially mutable by the user device 450). The user device 450 may thus only be permitted to mutate the order information 418 within the boundary of the one or more rules. For example, the order information 418 may include, for each of the one or more items, a respective price. The one or more rules may indicate that the respective prices cannot be changed. The user device 450, and thus the user, may be prevented from changing the price of individual items. In general, the user device 450 may be prevented from making changes such as: removing an item, changing a price of the item, and/or changing an order total (e.g., aside from using a validated discount code). Even if in some implementations it were possible to make such a modification by modifying an identifier and/or URL sent from the user device 450 to the server 410, the validating step would prevent such a modification thereby preventing the malicious activity.

In some embodiments, the one or more rules may indicate that one or more parts (e.g., elements or attributes) of the order information 418 may only be modified in a particular way. For example, a rule may indicate that a quantity of an item in the order information 418 may be increased but not decreased.

In some embodiments, the one or more rules may indicate that a particular modification may only be made, by the server 410, responsive to receiving approval (e.g., acceptance) of the modification from the point of sale device 430. The one or more rules may, for example, indicate that one or more parts of the order information 418 may only be modified responsive to the modification being approved by the point of sale device 430.

Therefore, in some embodiments, the server 410 may send an indication of the requested modification to the point of sale device 430 (not illustrated). The indication may be sent in an HTTP message, such as an HTTP request. The indication may be sent over the network between the server 410 and the point of sale device 430.

Figure 8:
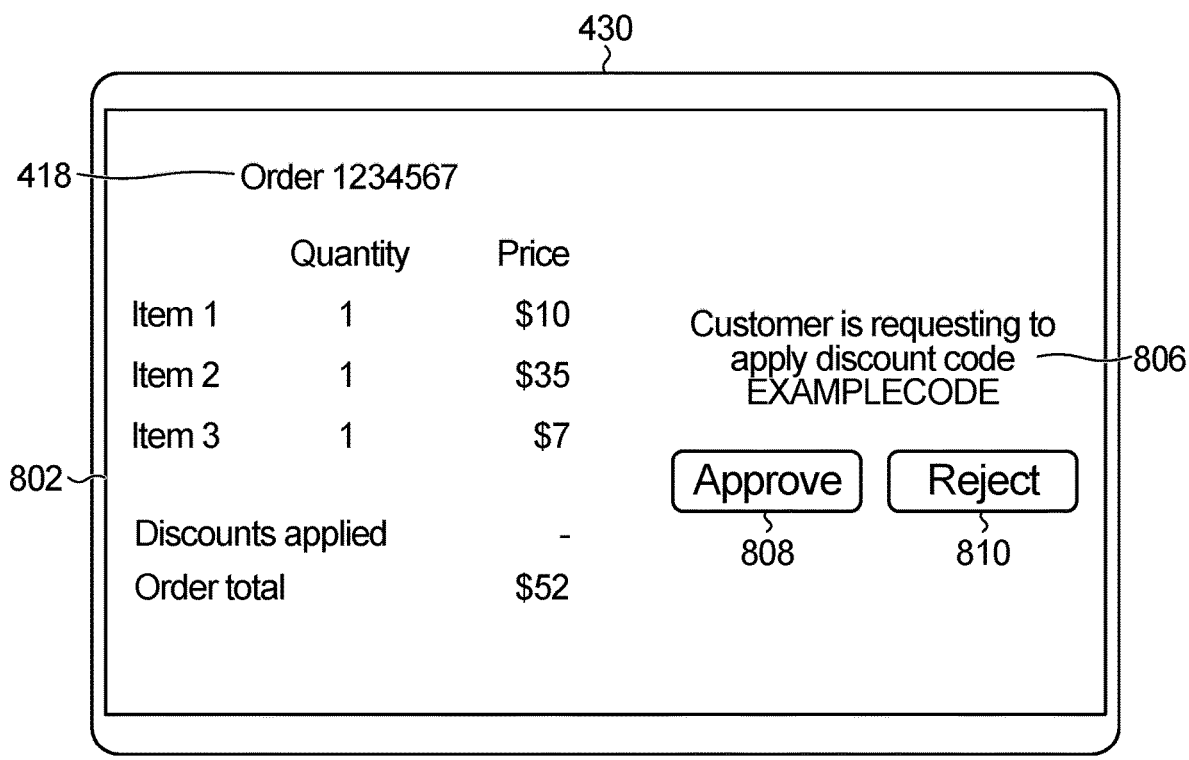

The point of sale device 430 may output the requested modification (e.g. using the user I/O 438) to the merchant. For example, the point of sale device 430 may display the requested modification on a display associated with the point of sale device 430 (e.g., in a user interface displayed on the display). The point of sale device 430 may present the merchant with an option to approve or reject the requested modification. FIG. 8 shows an example in which the requested modification 806 is displayed on a display 802 of the point of sale device 430, alongside the order information 418, a first button 808 and a second button 810. In this example, the order information 418 displayed on the point of sale device 430 is substantially the same as the order information 418 displayed on the user device 450. In other examples, different parts of the order information 418 may be displayed at the user device 450 and the point of sale device 430. Selection of the first button 808 by the merchant may indicate approval of the requested modification. Selection of the second button 810 by the merchant may indicate rejection of the requested modification. In general, any suitable means may be used to allow the merchant to enter their approval or rejection of the requested modification into the point of sale device 430.

Responsive to the merchant approving (e.g., entering an approval into the user I/O 438 of the point of sale device 430) the modification, the point of sale device 430 may indicate the approval of the requested modification to the server 410. Responsive to the merchant rejecting the modification (e.g., entering a rejection into the user I/O 458 of the point of sale device 430), the point of sale device 430 may indicate a rejection of the requested modification to the server 410. The rejection may be indicated to the server 410 explicitly. For example, the point of sale device 430 may send a message to the server 410 including the rejection. Alternatively, the point of sale device 430 might not send any response to the server 410, and the server 410 may interpret the lack of response (or a lack of response within a predetermined time period) as a rejection of the requested modification.

Similarly, the point of sale device 430 may interpret a lack of response from the merchant as an indication that the requested modification has been rejected. Thus, for example, the point of sale device 430 may present the merchant with the option to approve or reject the requested modification and, responsive to the failing to receive a response from the merchant, may indicate to the server 410 that requested modification has been rejected.

The server 410 may, in step 522, determine whether or not to perform the modification based on the indication from the point of sale device 430. Thus, the server 410 may perform the modification to the order information 418 responsive to receiving approval of the modification from the point of sale device 430. Alternatively, responsive to not receiving approval of the modification from point of sale device 430 (e.g., due to a lack of response or an explicit rejection), the server 410 might not perform the modification in step 522.

The server 410 may thus optionally request validation of the requested modification from the point of sale device 430. This may prevent the user from performing particular modifications without approval of the merchant. This may have the added advantage of allowing more flexibility in the types of changes that a user can make to the order information 418. For example, it may allow the user to remove an item from the order information 418 provided the removal is approved at the point of sale device 430. Without this option to validate changes at the point of sale device, the server 410 may instead not remove the item (e.g., prevent the requested modification) since it cannot determine whether or not the user is maliciously removing item (e.g. to reduce the price of the order) or, for example, changing their mind about one of the items they initially intended to purchase.

In some embodiments, the server 410 may validate the requested modification based on a user identifier. A merchant may have particular discounts or rewards that are only available to particular users (e.g., new users, or users that are subscribed to a loyalty program). Some users may pay different rates of tax on their purchases, whilst other users might not be liable to pay any tax on purchases. Validating the requested modification based on the user identifier enables the merchant to provide a tailored experience for the user. The server 410 may validate the requested modification based on the user identifier by, for example, determining that the requested modification relates to a discount code associated with the user identifier. This may be particularly appropriate when the discount code is only applicable to some, but not all, users (e.g., to some, but not all, of the merchant's customers). For example, the discount code may be specific to new customers (e.g., to user identifiers associated with new accounts). The discount code may be included in the request for the modification received in step 520.

In some embodiments, the server 410 may validate the requested modification based on the user identifier by determining that the requested modification relates to a tax exemption associated with the user identifier. The server 410 may, for example, receive a request from the user device 450 to exempt the order from a tax (e.g., a sales tax) or reduce the rate of tax. The server 410 may validate the requested tax exemption by determining that an account associated with the user identifier is registered for the tax exemption.

In some embodiments, the server 410 may validate the requested modification based on the user identifier by determining that the requested modification relates to a loyalty program to which the user identifier is subscribed. The server 410 may, for example, receive the user identifier in the request and, based on the user identifier, determine that the order is eligible for the loyalty program. The requested modification may, for example, relate to the addition of one or more rewards (e.g., points, credits, bonus items) to the order. The requested modification may relate to a discount that is specific to subscribers of the loyalty program, for example.

The user identifier may be included in the request for the modification or in the request for the order information 418 received in step 514, for example. The request to modify the order information 418 may, for example, include a user identifier and the server 410 may validate the requested modification based on the user identifier.

In some embodiments, the server 410 may, in step 522, modify the order information 418 based on a discount code. The server 410 may modify the order information 418 by, for example, updating the total price of the order based on a discount identified by the discount code. For example, the server 410 may calculate a new total price (e.g., $47) based on an initial total price (e.g., $52) and a discount (e.g., a $5 discount) identified by the discount code (e.g. EXAMPLE-CODE).

The server 410 may validate the discount code by comparing the discount code to one or more valid discount codes (e.g. stored in the memory 416). The server 410 may, for example, modify the order based on the discount code responsive to determining that the discount code is in the one or more valid discount codes. The discount code may be stored on the user device 450 (e.g., in the memory 456). The discount code may be entered into the user device 450 by the user. The discount code may be associated with an account identified by the user identifier. For example, the server 410 may retrieve the discount code from memory (e.g., the memory 416) based on the user identifier.

In some embodiments, the server 410 may validate the requested modification based on a payment status of the order. For example, the server 410 may reject a modification to the order information 418 that is requested during payment (e.g., after a payment has been initiated and before the payment has been completed). The server 410 may reject a modification to the order information 418 that is requested after payment has been completed (e.g., after the server 410 has received an indication that payment has been completed). Modification of the order information 418 at the server 410 may thus be prevented during and/or after payment for the order information 418. This may be particularly advantageous as it may reduce the risk of a race condition occurring between the user device 450 and the server 410, in which the server 410 is enabling payment for the order information 418, whilst the user device 450 is awaiting confirmation of an update of the order information 418.

In step 524, the server 410 may indicate, to the user device 450, an update to the order information 418 based on the modified order information 418. The indication may be sent to the user device 450 in an HTTP message, such as an HTTP response message. The indication may be sent over the network between the server 410 and the user device 450.

The indication may comprise an approval. The server 410 may, in step 524, indicate that the modification requested by the user device 450 has been made. For example, the server may, in step 520, receive a request to add a 10% tip and the server may, in step 524, indicate approval of the request, thereby indicating that the tip has been added. The update to the order information 418 may comprise an updated value of the order information 418. For example, the update may comprise one or more of the following: a discount applied to the order, an updated total price of the order, a tip applied to the order, a donation applied to the order, an amount of tax payable on the order (including no tax being payable on the order), an increase in a quantity of an item, or an addition of an item.

In step 526, the user device 450 may display the modification to the order information 418 on the display associated with the user device 450 (e.g., in a user interface displayed on the display). The user device 450 may, for example, update the order information 418 displayed in step 518 to show the modification.

Figure 9:
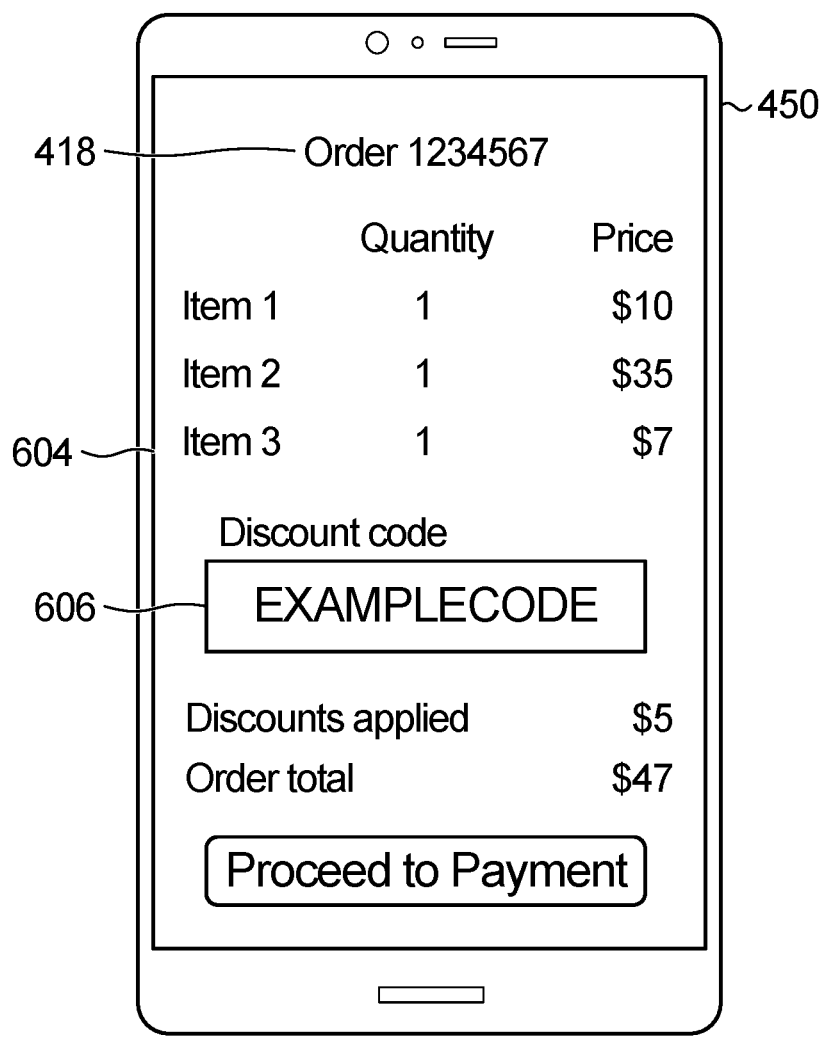

An example implementation of step 526 is shown in FIG. 9. As shown in FIG. 9, a total discount of $5 has been applied to the order information 418, causing the order total to be reduced to $47.

Figure 10:
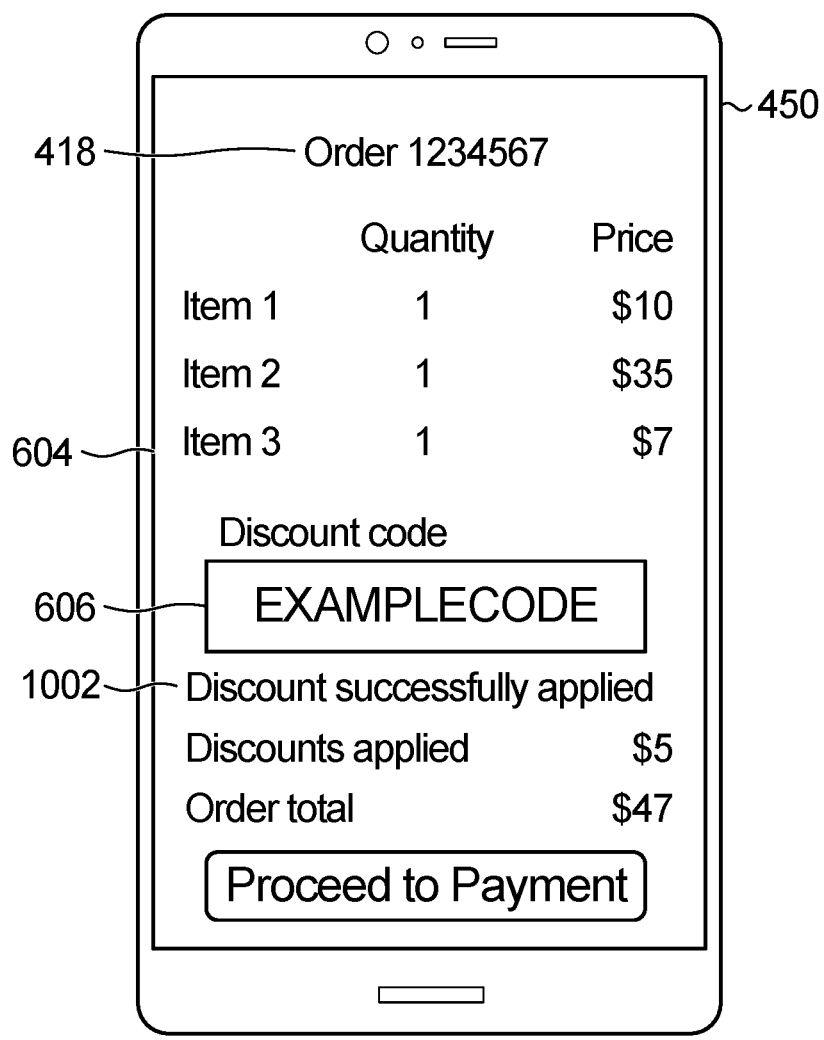

In addition to displaying the modification to the order information 418, the user device 450 may also display a notification that the requested modification has been made. An example implementation of this is shown in FIG. 10, in which a notification 1002 is displayed on the display of the user device 450 to indicate that a requested modification to the order information 418 to apply a discount code has been made. In this example, the notification 1002 states "Discount successfully applied". In general, the notification may indicate that the requested modification has been made using any suitable means.

The user device 450 may, additionally or alternatively, output the modification to the order information 418 to the user using other means. The user device 450 may, for example, output the modification to the order information 418 using a speaker (e.g. in an earbud or headset) that forms part of the user I/O 458. The user device 450 may, in general, output the modification to the order information 418 to the user using any aspect of the user I/O 458.

The server 410 may, additionally or alternatively, indicate, to the point of sale device 430, the update to the order information 418 based on the modified order information 418 (e.g., in a similar manner to indicating the update to the user device 450 as described above). The point of sale device 430 may display the modification to the order information 418 on the display associated with the point of sale device 430 (e.g., in a similar manner to displaying the update at the user device 450 as described above). In general, the notification may indicate that the requested modification has been made using any suitable means.

The point of sale device 450 may, additionally or alternatively, output the modification to the order information 418 to the merchant using other means.

In embodiments in which the server 410 does not make the change requested by the user device 450 (e.g., the requested modification is rejected or declined), the server 410 may indicate to the user device 450 and/or the point of sale device 430 that the requested modification has been rejected (e.g., has not been made and/or will not be made). The indication may be sent to the user device 450 in an HTTP message, such as an HTTP response message. The indication may be sent over the network between the server 410 and the user device 450, or the network between the server 410 and the point of sale device 430. The user device 450 outputs the rejection to the user (e.g., by displaying the rejection on a display associated with the user device 450, such as in a user interface displayed on the display). The user device 450 may further, based on the rejection, update the user interface to prevent the user from requesting the same modification again. For example, based on a rejection of a request to decrease a quantity of one of the items, the user device 450 may deactivate an element on the user interface (e.g., an input field in a web page) to prevent the user from attempting to decrease the quantity of the item again. The point of sale device 430 may output the rejection to the merchant (e.g., by displaying the rejection on a display associated with the point of sale device 430, such as in a user interface displayed on the display).

In step 528, the server 410 may determine that payment for the order information 418 has been completed. That is, the server 410 may determine that payment for the one or more items subject to any additions (e.g., taxes, tips, donations or other surcharges) and/or any discounts (e.g., as specified by any of: an offer, an account credit, a discount code, and/or a discount scheme) has been made. In this context, completion of payment may not necessarily require that the merchant has received payment from the user. Completion of payment may mean that, for example, a payment service has processed the payment. For example, completion of payment may mean that the user has agreed to a payment plan with the payment service. In another example, completion of payment may mean that the payment (e.g., using a debit or credit card) has been authorized and/or authenticated.

The server 410 may, prior to step 528, communicate with the user device 450 to enable payment for the modified order information 418. For example, the server 410 may direct the user device 450 to a payment service (e.g., the payment service 120) for completing payment. Payment may be for all or part of the order information 418. In some embodiments, the user device 450 may present a plurality of payment options based on the user identifier. The plurality of payment options may be received from the payment service. Different payment options may be provided to the user device based on the identity of the user. Different payment plans may be offered to different users. For example, the user device 450 may present a payment option with payments spread over multiple installments based on the user identifier being associated with an account with a good credit rating. In another example, the user device 450 may present only the payment option of paying for the entire order information 418 based on the user identifier being associated with an account with a bad credit rating.

The payment service and/or the user device 450 may notify the server 410 when payment is completed (e.g., on request from the server 410 or using a webhook). It may be advantageous for the payment service to notify the server 410 when payment is completed as this may reduce the risk of a malicious user creating a fake payment notification to cause the server 410 to act as if payment has completed.

The server 410 may thus determine that payment has been completed based on receiving an indication that payment for the modified order information 418 has been completed. The server 410 may receive the indication from a third-party (e.g., a third-party server or service). The server 410 may receive the indication from a payment service, such as the payments service 120. The payment service may be engaged by (e.g., in communication with) an application on the user device 450, for example. The server 410 may receive the indication from a payment terminal (e.g., a payment terminal separate to the point of sale device 430), or from a server connected to the payment terminal. The payment terminal may include, for example, till and/or a card reader. The server 410 may receive the indication from the user device 450. The server 410 may receive the indication from the point of sale device 430. The user may pay for the order at the point of sale device 430 (e.g., using a payment card, a digital wallet, cash, a bank transfer and/or a cheque) and the point of sale device 430 may send an indication to the server 410 that payment has been completed. The server 410 may thus still be notified that payment has been completed even when payment for the order information 418 is completed in-person. In embodiments in which the point of sale device 430 indicates to the server 410 that payment has been completed, step 530 (described below) may be omitted.

In step 530, the server 410 may indicate to the point of sale device 430 that payment for the modified order information 418 has been completed. By indicating to the point of sale device that payment has been completed, the merchant can confirm that the items have been paid for (e.g., before providing the purchased products and/or services to the user). This prevents a malicious user from presenting a payment confirmation for another order to the merchant to deceive the merchant into thinking that the items have been paid for, thereby reducing the risk of theft or underpayment.

The server 410 may include some or all of the order information 418 in the indication. For example, the indication may include the identifier for the order information 418. Including the identifier for the order information 418 in the indication that payment has been completed allows the merchant to unambiguously determine which order has been paid for. The indication may indicate the one or more items. This may enable the merchant to determine which items have been paid for.

Based on the indication that payment for the modified order information 418 has been completed, the point of sale device 430 may update a user interface displayed on a display associated with the point of sale device 430 (e.g., the user interface used to display the order information 418 to the merchant) to reflect that payment has been completed. The indication sent to the point of sale device 430 may include instructions to update the user interface. Alternatively, the indication might not include any explicit instructions and the point of sale device 430 may determine the update of the user interface based on the indication that payment has been completed.

FIG. 11 shows an example in which a user interface displayed on a display associated with the point of sale device 430 is updated to reflect that payment has been completed. The user interface has been updated to show a notification 1102 stating that "Payment for Order 1234567 has been completed". It will be appreciated that this is an example of a notification that may be used and, in general, the notification may take any suitable form.

The server 410 may, additionally or alternatively, indicate to the user device 450 that payment for the modified order information 418 has been completed (e.g., in a similar manner to indicating that payment has been completed to the point of sale device 430 as described above). The user device 450 may update a user interface displayed on a display associated with the user device 450 to reflect that payment has been completed (e.g., in a similar manner to updating a user interface displayed on a display associated with the point of sale device 430 as described above).

The server 410 may indicate that payment for the modified order information 418 has been completed to the point of sale device 430 and/or the user device 450 on request. The point of sale device 430 and/or the user device 450 may monitor the server 410 (e.g., poll the server 410) for payment confirmation. For example, the point of sale device 430 and/or the user device 450 may send one or more requests to the server 410 for confirmation that payment has been completed. The one or more requests may be included in respective HTTP messages, such as HTTP requests. Prior to determining that payment has been completed, the server 410 may send a response indicating that payment has not yet completed. The response may be sent in an HTTP message, such as an HTTP response. The HTTP response may include a 202 status message. After determining that payment has been completed, the server 410 may respond to a request with the indication that payment has been completed. The server 410 may send the indication in an HTTP message, such as an HTTP response. The HTTP response may include the 200 status code, for example.

The server 410 may indicate that payment for the modified order information 418 has been completed to the point of sale device 430 and/or the user device 450 using a webhook. The server 410 may, for example, send the indication to the point of sale device 430 and/or the user device 450 by sending the indication to a URL of the respective device. The indication may be sent in an HTTP GET request, for example.

Example Methods

Figure 12:
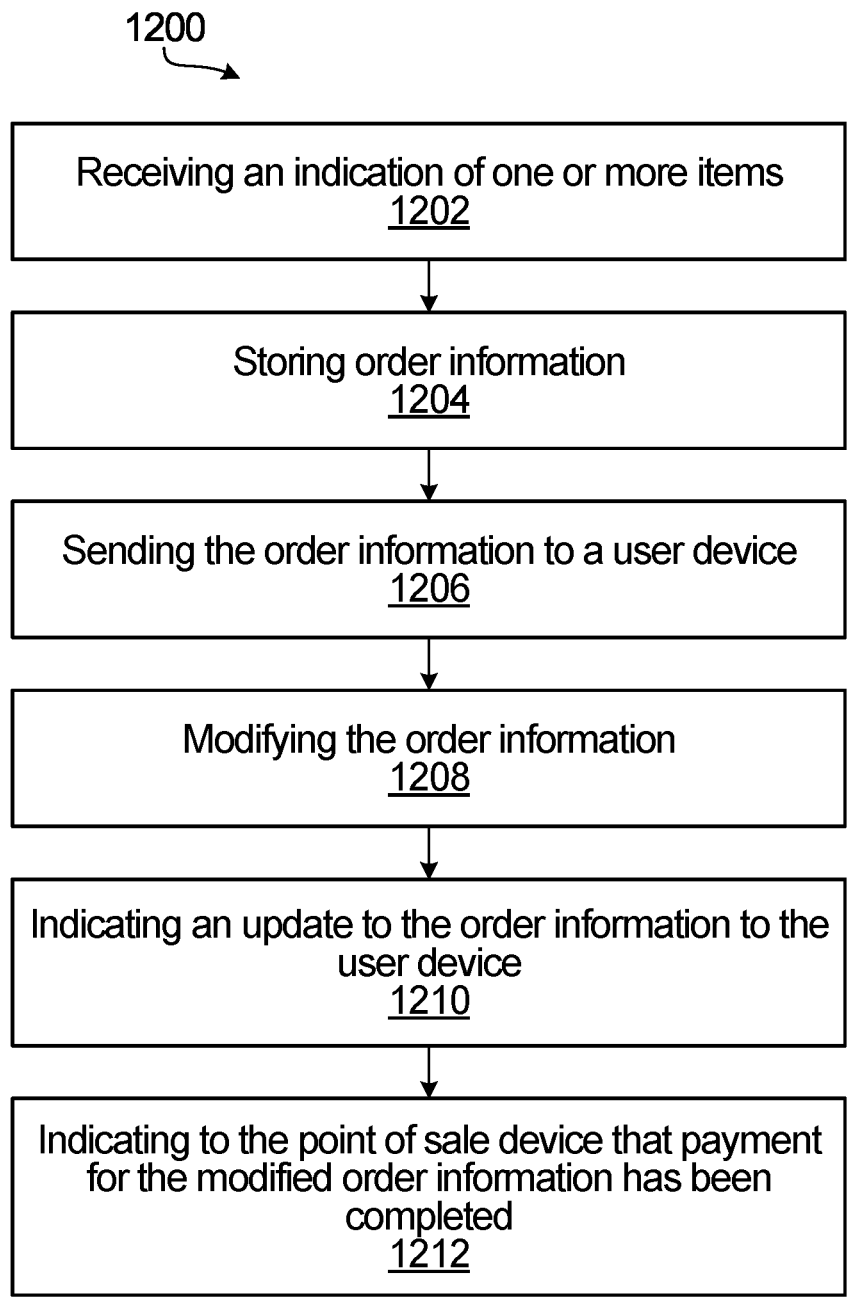
FIG. 12 is a flowchart of a computer-implemented method according to embodiments of the disclosure.

FIG. 12 illustrates a computer-implemented method 1200, according to one embodiment. Not all of the steps in the method 1200 of FIG. 12 are necessary in all embodiments. Also, some of the steps may be substituted by other steps instead. The method 1200 may be performed by or on an e-commerce platform, such as e-commerce platform 100, although this is not necessary. In method 1200, the steps are described as being performed by the processor 412 of server 410 of FIG. 4, but this is only an example. For example, the method 1200 may instead be performed by another entity, which might or might not be part of an e-commerce platform.

In step 1202, the processor 412 receives, at the server 410 from a point of sale device, an indication of one or more items entered into the point of sale device. The indication may be received in an HTTP message, such as an HTTP request. The processor 412 may receive the order information over a network, such as a network between the server 410 and the point of sale device. The point of sale device may be the point of sale device 430. Step 1202 may be performed in accordance with step 504 described above, for example.

In step 1204, the processor 412 stores, at the server 410, order information for the one or more items. The processor 412 may store the order information in the memory 416, for example. The order information may be the order information 418. The order information is associated with an identifier for accessing the order information. Step 1204 may be performed in accordance with step 506 described above, for example.

In some embodiments, the order information may be generated at the server 410. For example, the processor 412 may generate the order information based on the indication received from the point of sale device in step 1202.

In other embodiments, the processor 412 may receive the order information from the point of sale device, in which the order information is generated by the point of sale device based on the one or more items entered into the point of sale device. The indication received in step 1202 may comprise the order information, for example.

In some embodiments, the order information relating to the one or more items may comprise, for each of the one or more items, at least one of: an identifier for the respective item, a price of the respective item, a description for the respective item, or an image for the respective item.

In step 1206, the processor 412 sends the order information relating to the one or more items to a user device responsive to receiving, from the user device, a request for the order information identified by the identifier. The processor 412 may send the order information in an HTTP message, such as an HTTP response. The processor 412 may send the order information over a network, such as a network between the server 410 and the user device. The user device may be the user device 450. Step 1206 may be performed in accordance with step 516 described above, for example.

In some embodiments, the order information may be sent to the user device for display on a display associated with the user device.

In some embodiments, the identifier may be obtained by the user device from the point of sale device. The identifier may be obtained by the user device by scanning a machine-readable indicium displayed on a display associated with the point of sale device (e.g., as described above in step 512). The machine-readable indicium may include one or more of: a quick response (QR) code, a barcode, machine-readable text (e.g., text that can be read using OCR), or any other suitable indicium. The machine-readable indicium may encode an address link, such as a URL or deep link (e.g., a mobile deep link) identifying the order information.

In some embodiments, the identifier may comprise an address link identifying the order information. The identifier may comprise a URL identifying the order information.

In some embodiments, the method 1200 may further involve sending, for receipt by the user device, the identifier for the order information stored at the server. The processor 412 may, for example, send the identifier to the point of sale device for receipt by the user device (e.g., as described above in step 508). The processor 412 may send the identifier in an HTTP message, such as an HTTP response. The processor 412 may send the identifier to the point of sale device over a network, such as a network between the server 410 and the point of sale device.

In step 1208, the processor 412 modifies the order information at the server responsive to receiving a request for a modification to the order information identified by the identifier. The request for the modification to the order information identified by the identifier may come from (e.g., be initiated by or received from) the user device. In other embodiments, the request may come from (e.g., be initiated by or received from) another device, or may originate on the server itself. The processor 412 may receive the request for a modification in an HTTP message, such as an HTTP request. The processor 412 may receive the order information over a network, such as a network between the server 410 and the user device. The processor 412 may modify the order information stored in a memory (e.g., the memory 416) at the server. Step 1208 may be performed in accordance with step 522 described above, for example.

In some embodiments, modifying the order information at the server responsive to receiving the request from the user device for the modification to the order information may involve modifying the order information responsive to validating, at the server, the requested modification to the order information (e.g., as described above in respect of validating the order information 418 in the method 500). Validating the requested modification to the order information may comprise determining that the requested modification complies with one or more rules. The rules may be the one or more rules described above in respect of the method 500.

In some embodiments, the request to modify the order information may comprise a user identifier. The user identifier may be the user identifier described above in respect of the method 500. Validating, at the server, the requested modification to the order information may comprise validating, at the server, the requested modification based on the user identifier (e.g., as described above in the method 500).

In some embodiments, validating, at the server, the requested modification based on the user identifier may comprise at least one of: determining that the requested modification relates to a discount code associated with the user identifier, determining that the requested modification relates to a tax exemption associated with the user identifier, or determining that the requested modification relates to a loyalty program to which the user identifier is subscribed.

In some embodiments, modifying the order information at the server responsive to receiving, from the user device, the request for the modification to the order information may comprise modifying the order information based on a discount code stored on the user device.

In some embodiments, modifying the order information at the server responsive to receiving the request from the user device for the modification to the order information may comprise modifying the order information responsive to receiving, from the point of sale device, approval of the requested modification to the order information (e.g., as described above in respect of FIG. 8). The processor 412 may receive the approval in an HTTP message, such as an HTTP response. The processor 412 may receive the approval over a network, such as a network between the server 410 and the point of sale device.

In step 1210, the processor 412 indicates, to the user device, an update to the order information based on the modified order information. The processor 412 may send the update in an HTTP message, such as an HTTP response. The processor 412 may send the update over a network, such as a network between the server 410 and the user device. Step 1210 may be performed in accordance with step 524 described above, for example.

In step 1212, the processor indicates to the point of sale device that payment for the modified order information has been completed responsive to determining that payment for the modified order information has been completed. The processor 412 may indicate that payment for the modified order information has been completed by sending an indication to the point of sale device in an HTTP message, such as an HTTP response. The processor 412 may indicate that payment for the modified order information has been completed by sending an indication over a network, such as a network between the server 410 and the user device. Step 1212 may be performed in accordance with step 530 described above, for example.

In some embodiments, indicating to the point of sale device that payment for the modified order information has been completed may comprise sending instructions to the point of sale device to update a user interface displayed on a display associated with the point of sale device to reflect that payment has been completed (e.g., as described above in respect of FIG. 11).

In some embodiments, the method 1200 may also involve sending, to the point of sale device, an indication of the requested modification to the order information.

In some embodiments, the method 1200 may also involve communicating with the user device to enable payment for the modified order information. The processor 412 may communicate with the user device over a network, such as a network between the server 410 and the user device.

In some embodiments, determining that payment for the modified order information has been completed may comprise receiving an indication that payment for the modified order information has been completed. The indication may be received from a third-party. The indication may be received from a payment service engaged by the user device. The indication may be received from a payment service (e.g., as described above in the method 500). The indication may be received in an HTTP message, such as an HTTP response. The indication may be received over a network, such as a network between the server 410 and a third-party server or service.

In some embodiments of the method 1200, the processor 412 may prevent a modification from being made to the order information responsive to the modification failing validation at the server. The modification may be the requested modification referred to in the description of step 1208 above. Thus, for example, the processor 412 may, instead of modifying the order information in step 1208, prevent the modification from being made. Alternatively, the processor 412 may prevent another modification from being made responsive to the other modification failing validation at the server.

In some embodiments of the method 1200, the order information (e.g., the order information stored at the server 410) cannot be modified by changing the identifier or an address link (such as a URL or deep link) in which the identifier is carried. The order information may be modifiable on request only. The user device may be prevented from editing the order information directly. Modification of the order information may be controlled by the server. Modification of the order information may be on request (e.g., to the server) only. The one or more items may not be serialized into the identifier, an address link based on the identifier or a machine-readable indicium carrying the identifier and/or address link. For example, the one or more items may not be serialized into a QR code (e.g., a QR code presented to the user device).

Technical benefits of some embodiments include the following. Rather than a server transmitting, to the user device, just an order total, the server instead can provide additional information related to the order for display on the user device, such as the information shown in FIG. 6. Some of the order information may even be modifiable by the user. However, permitting this additional functionality opens up the opportunity for the user to perform malicious activity at the user device, such as modifying the order information at the user device to remove an item from the cart by modifying an address link (e.g. URL) used to generate a cart at a server.

In embodiments herein, the network exchange protocol between the user device and the server is configured to prevent such malicious activity. For example, modification of the identifier and/or an address link received by the user device (e.g., by scanning a QR code) does not allow for a modified cart with fewer items or a lower cost, but instead would lead to an error. The identifier and/or address link may be for accessing order information stored at the server (e.g., may indicate a location at the server where the order information is stored) and thus may indicate a location, rather than the content, of the order information. As such, changing the identifier and/or the address link may direct the user device to a different location on the server (e.g., without causing any change to be made to the order information). An attempt by a user to change the order information by changing the identifier and/or address link may thus result in an error being returned to the user device because no order information can be found at the location indicated by modified identifier and/or address link or because the user device does not have permission to access the location indicated by the modified identifier.

There is a possibility that a malicious user may attempt to change the order by changing the identifier and/or address link and instead obtain a modified identifier and/or address link for accessing other order information (e.g., for accessing another order for another merchant or at another store). However, even in this circumstance, the modified identifier and/or address link would still not cause any modification to either the order information or the other order information stored at the server. In addition, the merchant can still verify whether or not the correct order information has been paid for because the server may, in some embodiments, indicate to the point of sale device that payment for the order information has been completed. For example, even if the user engaged a payment service using their user device to pay for the other order accessed by modifying the identifier and/or the address link (e.g., by communicating with the server and/or the payment service based on the modified identifier), the merchant may determine that the order has not been paid for because the point of sale device might not have received an indication that payment has been completed. This further reduces the risk of underpayment of an order, whether through accident or malicious activity. In some embodiments, the indication that payment for the order information has been completed may include the identifier for the order information, allowing the merchant to unambiguously determine which order has been paid for.

In some embodiments, a system (e.g., the system 400 or a part of the system 400, such as the server 410) is provided for performing the methods described above. The system may include a memory (e.g. memory 416) to store, at the server, order information for the one or more items, in which the order information is associated with an identifier for accessing the order information. The system may further include at least one processor (e.g. processor 412) to perform operations such as: sending the order information relating to the one or more items to a user device (e.g., the user device 450) responsive to receiving, from the user device, a request for the order information identified by the identifier; modifying the order information at the server responsive to receiving, from the user device, a request for a modification to the order information identified by the identifier; indicating, to the user device, an update to the order information based on the modified order information; and indicating to the point of sale device that payment for the modified order information has been completed responsive to determining that payment for the modified order information has been completed.

In some embodiments, a computer-readable medium is provided having stored thereon computer-executable instructions that, when executed by a computer, cause the computer to perform method steps described above. The computer-readable medium may be transitory or non-transitory.

CONCLUSION

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present invention has been described with reference to specific features and embodiments thereof, various modifications and combinations may be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations may be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

Memory, as used herein, may refer to memory that is persistent (e.g. read-only-memory (ROM) or a disk), or memory that is volatile (e.g. random access memory (RAM)). The memory may be distributed, e.g. a same memory may be distributed over one or more servers or locations.

The invention claimed is:

1. A computer-implemented method comprising:
   receiving, at a server from a point of sale device, an indication of one or more items entered into the point of sale device;
   storing, at the server, order information for the one or more items, the order information being associated with a uniform resource locator (URL) having an identifier that permits a user device to access the order information over the internet;
   transmitting the URL to the point of sale device and causing encoding of the URL into a machine-readable indicium and causing display of the machine-readable indicium encoding the URL on the point of sale device, wherein the machine-readable indicium is scannable by the user device to obtain the URL, and wherein modification of the URL cannot modify the order information;
   receiving, at the server from the user device, a Hypertext Transfer Protocol (HTTP) request for the order information, the HTTP request received over the internet, the HTTP request based on the URL obtained by the user device, and the URL having the identifier identifying the order information;
   responsive to receiving, from the user device, the HTTP request for the order information identified by the identifier, sending a web page having the order information relating to the one or more items over the internet to the user device;
   receiving over the internet at the server, from the user device, an HTTP request for a modification to the order information identified by the identifier;
   responsive to receiving the HTTP request for the modification, determining that the requested modification complies with one or more rules that validate that the modification does not represent malicious activity, including determining that the requested modification is to one or more parts of the order information that is permitted to be modified;
   transmitting to the point of sale device an indication of the requested modification and causing display of the requested modification on the point of sale device;
   receiving, from the point of sale device, approval of the requested modification;
   only responsive to both determining that the requested modification complies with the one or more rules and receiving the approval from the point of sale device, modifying the order information at the server, thereby preventing any malicious attempt to make modifications that do not comply with the one or more rules, including preventing modification of parts of the order information that are not permitted to be modified;
   indicating, to the user device over the internet, an update to the order information based on the modified order information; and
   responsive to determining that payment for the modified order information has been completed, indicating to the point of sale device that payment for the modified order information has been completed, thereby providing confirmation of the payment separate from any payment confirmation that may be maliciously presented by the user device.

2. The computer-implemented method of claim 1, wherein the machine-readable indicium is a quick response (QR) code.

3. The computer-implemented method of claim 1, wherein the request to modify the order information comprises a user identifier and wherein responsive to receiving the request to modify the order information, the method further comprises validating, at the server, the requested modification based on the user identifier.

4. The computer-implemented method of claim 3, wherein validating, at the server, the requested modification based on the user identifier comprises at least one of:
   determining that the requested modification relates to a discount code associated with the user identifier;
   determining that the requested modification relates to a tax exemption associated with the user identifier; or
   determining that the requested modification relates to a loyalty program to which the user identifier is subscribed.

5. The computer-implemented method of claim 1, wherein modifying the order information at the server comprises:
   modifying the order information based on a discount code from the user device.

6. The computer-implemented method of claim 1, further comprising:
   sending, for receipt by the user device, the identifier for the order information stored at the server.

7. The computer-implemented method of claim 1, wherein indicating to the point of sale device that payment for the modified order information has been completed comprises:
   sending instructions to the point of sale device to update a user interface displayed on a display associated with the point of sale device to reflect that payment has been completed.

8. The computer-implemented method of claim 1, wherein the order information relating to the one or more items comprises, for each of the one or more items, at least one of:
   an identifier for the respective item;
   a price of the respective item;
   a description for the respective item; or
   an image for the respective item.

9. The computer-implemented method of claim 1, further comprising communicating with the user device to enable payment for the modified order information.

10. The computer-implemented method of claim 9, wherein determining that payment for the modified order information has been completed comprises receiving an indication that payment for the modified order information has been completed.

11. A system comprising:
    a processor at a server to receive, from a point of sale device, an indication of one or more items entered into the point of sale device;
    memory at the server to store order information for the one or more items, the order information being associated with a uniform resource locator (URL) having an identifier that permits a user device to access the order information over the internet,
    wherein the processor is further to:

transmit the URL to the point of sale device and cause encoding of the URL into a machine-readable indicium and cause display of the machine-readable indicium encoding the URL on the point of sale device, wherein the machine-readable indicium is scannable by the user device to obtain the URL, and wherein modification of the URL cannot modify the order information;

receive, at the server from the user device, a Hypertext Transfer Protocol (HTTP) request for the order information, the HTTP request received over the internet, the HTTP request based on the URL obtained by the user device, and the URL having the identifier identifying the order information;

responsive to receiving, from the user device, the HTTP request for the order information identified by the identifier, send a web page having the order information relating to the one or more items over the internet to the user device;

receive over the internet at the server, from the user device, an HTTP request for a modification to the order information identified by the identifier;

responsive to receiving the HTTP request for the modification, determine that the requested modification complies with one or more rules that validate that the modification does not represent malicious activity, including determining that the requested modification is to one or more parts of the order information that is permitted to be modified;

transmit to the point of sale device an indication of the requested modification and causing display of the requested modification on the point of sale device;

receive, from the point of sale device, approval of the requested modification;

only responsive to both determining that the requested modification complies with the one or more rules and receiving the approval from the point of sale device, modify the order information at the server, thereby preventing any malicious attempt to make modifications that do not comply with the one or more rules, including preventing modification of parts of the order information that are not permitted to be modified;

indicate, to the user device over the internet, an update to the order information based on the modified order information; and responsive to determining that payment for the modified order information has been completed, indicate to the point of sale device that payment for the modified order information has been completed, thereby providing confirmation of the payment separate from any payment confirmation that may be maliciously presented by the user device.

12. The system of claim 11, wherein the processor is to indicate to the point of sale device that payment for the modified order information has been completed by:
sending instructions to the point of sale device to update a user interface displayed on a display associated with the point of sale device to reflect that payment has been completed.

13. A non-transitory computer readable medium having stored thereon computer-executable instructions that, when executed by a computer, causes the computer to perform operations comprising:
receiving, at a server from a point of sale device, an indication of one or more items entered into the point of sale device;

storing, at the server, order information for the one or more items, the order information being associated with a uniform resource locator (URL) having an identifier that permits a user device to access the order information over the internet;

transmitting the URL to the point of sale device and causing encoding of the URL into a machine-readable indicium and causing display of the machine-readable indicium encoding the URL on the point of sale device, wherein the machine-readable indicium is scannable by the user device to obtain the URL, and wherein modification of the URL cannot modify the order information;

receiving, at the server from the user device, a Hypertext Transfer Protocol (HTTP) request for the order information, the HTTP request received over the internet, the HTTP request based on the URL obtained by the user device, and the URL having the identifier identifying the order information;

responsive to receiving, from the user device, the HTTP request for the order information identified by the identifier, sending a web page having the order information relating to the one or more items over the internet to the user device;

receiving over the internet at the server, from the user device, an HTTP request for a modification to the order information identified by the identifier;

responsive to receiving the HTTP request for the modification, determining that the requested modification complies with one or more rules that validate that the modification does not represent malicious activity, including determining that the requested modification is to one or more parts of the order information that is permitted to be modified;

transmitting to the point of sale device an indication of the requested modification and causing display of the requested modification on the point of sale device;

receiving, from the point of sale device, approval of the requested modification;

only responsive to both determining that the requested modification complies with the one or more rules and receiving the approval from the point of sale device, modifying the order information at the server, thereby preventing any malicious attempt to make modifications that do not comply with the one or more rules, including preventing modification of parts of the order information that are not permitted to be modified;

indicating, to the user device over the internet, an update to the order information based on the modified order information; and responsive to determining that payment for the modified order information has been completed, indicating to the point of sale device that payment for the modified order information has been completed, thereby providing confirmation of the payment separate from any payment confirmation that may be maliciously presented by the user device.

14. The computer-implemented method of claim 1, wherein determining that the requested modification complies with the one or more rules comprises determining that the requested modification is only to at least one of:
a tip amount;
a donation amount;
a discount code;
a tax exemption;
a delivery or shipping option; or
a loyalty program.

15. The system of claim 11, wherein the processor is to determine that the requested modification complies with the one or more rules by performing operations including determining that the requested modification is only to at least one of:
- a tip amount;
- a donation amount;
- a discount code;
- a tax exemption;
- a delivery or shipping option; or
- a loyalty program.

16. The system of claim 11, wherein the machine-readable indicium is a quick response (QR) code.

17. The system of claim 11, wherein the request to modify the order information comprises a user identifier and wherein responsive to receiving the request to modify the order information, the processor is to validate the requested modification based on the user identifier.

18. The system of claim 17, wherein the processor is to validate the requested modification based on the user identifier by performing at least one of:
- determining that the requested modification relates to a discount code associated with the user identifier;
- determining that the requested modification relates to a tax exemption associated with the user identifier; or
- determining that the requested modification relates to a loyalty program to which the user identifier is subscribed.

19. The system of claim 11, wherein the processor is to modify the order information at the server by modifying the order information based on a discount code from the user device.

20. The system of claim 11, wherein the order information relating to the one or more items comprises, for each of the one or more items, at least one of:
- an identifier for the respective item;
- a price of the respective item;
- a description for the respective item; or
- an image for the respective item.

21. The system of claim 11, wherein the processor is further to communicate with the user device to enable payment for the modified order information.

22. The system of claim 21, wherein the processor is to determine that payment for the modified order information has been completed by receiving an indication that payment for the modified order information has been completed.

23. The non-transitory computer readable medium of claim 13, wherein determining that the requested modification complies with the one or more rules comprises determining that the requested modification is only to at least one of:
- a tip amount;
- a donation amount;
- a discount code;
- a tax exemption;
- a delivery or shipping option; or
- a loyalty program.

24. The non-transitory computer readable medium of claim 13, wherein the machine-readable indicium is a quick response (QR) code.

25. The non-transitory computer readable medium of claim 13, wherein modifying the order information at the server comprises modifying the order information based on a discount code from the user device.

* * * * *